(12) United States Patent
Melkovitz

(10) Patent No.: US 12,551,991 B2
(45) Date of Patent: Feb. 17, 2026

(54) TOOL WITH RATCHET MECHANISM

(71) Applicant: Milwaukee Electric Tool Corporation, Brookfield, WI (US)

(72) Inventor: Jack C. Melkovitz, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 385 days.

(21) Appl. No.: 18/064,078

(22) Filed: Dec. 9, 2022

(65) Prior Publication Data

US 2023/0106820 A1    Apr. 6, 2023

Related U.S. Application Data

(63) Continuation of application No. PCT/US2022/043201, filed on Sep. 12, 2022.

(60) Provisional application No. 63/388,027, filed on Jul. 11, 2022, provisional application No. 63/288,972, filed on Dec. 13, 2021, provisional application No. 63/243,294, filed on Sep. 13, 2021.

(51) Int. Cl.
   *B25B 13/46*    (2006.01)
(52) U.S. Cl.
   CPC .................... *B25B 13/463* (2013.01)
(58) Field of Classification Search
   CPC ........ B25B 13/463; B25B 13/04; B25B 13/08
   USPC ............................................................ 81/60
   See application file for complete search history.

(56) References Cited

U.S. PATENT DOCUMENTS

| 4,631,990 A | 12/1986 | Hughes |
| 5,537,899 A | 7/1996 | Diedrich |
| 5,983,757 A | 11/1999 | Blise et al. |
| 6,279,428 B1 | 8/2001 | Huang |
| 6,457,386 B1 | 10/2002 | Chiang |
| 6,769,330 B2 | 8/2004 | Chang |
| 6,857,339 B2 | 2/2005 | Chen |
| 6,918,323 B2 | 7/2005 | Arnold et al. |
| 6,964,216 B2 | 11/2005 | Chen |
| 6,966,241 B2 | 11/2005 | Huang |
| 6,971,285 B2 | 12/2005 | Chen |
| 6,981,434 B2 | 1/2006 | Chen |

(Continued)

FOREIGN PATENT DOCUMENTS

| CN | 203804858 | 9/2014 |
| CN | 206383086 | 8/2017 |

(Continued)

OTHER PUBLICATIONS

International Search Report and Written Opinion for International Application No. PCT/US2022/043201, dated Dec. 28, 2022, 12 pages.

*Primary Examiner* — Hadi Shakeri
(74) *Attorney, Agent, or Firm* — Reinhart Boerner Van Deuren s.c.

(57) ABSTRACT

Various designs for a ratchet mechanism and tools incorporating a ratchet mechanism are described. One embodiment relates to a ratchet with each layer of the gear stack includes teeth rotationally offset from each other increasing the number of circumferentially spaced gear tooth surfaces that are available to engage with the pawl teeth. Another embodiment relates to a ratchet with multiple pawls placed in series such that the pawls are spaced circumferentially around the gear.

13 Claims, 23 Drawing Sheets

(56) References Cited

U.S. PATENT DOCUMENTS

| | | | |
|---|---|---|---|
| 7,073,412 B1 * | 7/2006 | Arnold | B25B 13/463 81/60 |
| 7,080,579 B2 | 7/2006 | Chen | |
| 7,131,353 B2 | 11/2006 | Arnold et al. | |
| 7,185,566 B2 | 3/2007 | Arnold et al. | |
| 7,207,244 B2 | 4/2007 | Chen | |
| 7,263,919 B2 | 9/2007 | Arnold | |
| 7,299,720 B1 | 11/2007 | Schultz et al. | |
| 7,311,186 B2 | 12/2007 | Liao | |
| 7,661,337 B2 | 2/2010 | Chen | |
| 7,802,498 B2 | 9/2010 | Hu | |
| 7,836,798 B2 | 11/2010 | Hu | |
| 7,938,042 B2 | 5/2011 | Hu | |
| 8,250,947 B2 | 8/2012 | Hu | |
| 8,291,792 B2 | 10/2012 | Yang | |
| 8,495,931 B2 | 7/2013 | Sroka | |
| 8,499,666 B2 | 8/2013 | Hopper et al. | |
| 8,567,287 B2 | 10/2013 | Gapp et al. | |
| 8,596,170 B2 | 12/2013 | Yang | |
| 8,720,308 B2 | 5/2014 | Hopper et al. | |
| 8,931,375 B2 | 1/2015 | Huang | |
| 9,038,507 B2 | 5/2015 | Thompson et al. | |
| 9,120,211 B2 * | 9/2015 | Huang | B25B 13/481 |
| 9,278,435 B2 | 3/2016 | Tsai | |
| 9,364,940 B2 | 6/2016 | Wu | |
| 9,649,751 B2 | 5/2017 | Min | |
| 9,709,141 B2 | 7/2017 | Thompson et al. | |
| 9,808,916 B2 | 11/2017 | Gapp et al. | |
| 9,862,076 B2 * | 1/2018 | Lai | B25B 13/462 |
| 9,969,064 B2 | 5/2018 | Huang | |
| 10,016,880 B2 | 7/2018 | Chung | |
| 10,099,349 B2 | 10/2018 | Thompson et al. | |
| 10,118,278 B2 | 11/2018 | Thompson et al. | |
| 10,322,497 B2 | 6/2019 | Thompson et al. | |
| 10,730,168 B2 | 8/2020 | Solar et al. | |
| 10,864,616 B2 | 12/2020 | Thompson et al. | |
| 2003/0192408 A1 | 10/2003 | Garg | |
| 2006/0117913 A1 | 6/2006 | Chen | |
| 2010/0251859 A1 | 10/2010 | Gapp et al. | |
| 2011/0113930 A1 | 5/2011 | Liao | |
| 2012/0036966 A1 | 2/2012 | Lee | |
| 2012/0036968 A1 | 2/2012 | Lee | |
| 2013/0269488 A1 | 10/2013 | Huang | |
| 2013/0276592 A1 | 10/2013 | Sroka | |
| 2015/0196994 A1 | 7/2015 | Huang | |
| 2015/0328751 A1 | 11/2015 | Thompson et al. | |
| 2019/0375075 A1 | 12/2019 | Thompson | |
| 2020/0189075 A1 | 6/2020 | Thompson | |
| 2020/0298379 A1 | 9/2020 | Blumenthal et al. | |
| 2020/0353603 A1 | 11/2020 | Solar et al. | |
| 2021/0078141 A1 | 3/2021 | Chen | |
| 2021/0331295 A1 | 10/2021 | Lin | |

FOREIGN PATENT DOCUMENTS

| | | |
|---|---|---|
| CN | 206967376 | 2/2018 |
| CN | 213197313 | 5/2021 |
| DE | 202016103335 | 8/2016 |
| DE | 202016105779 | 1/2017 |
| DE | 202017102185 | 7/2017 |
| DE | 202018102818 | 8/2018 |
| DE | 102019100081 | 9/2020 |
| EP | 1510293 | 5/2008 |
| EP | 3056313 | 9/2017 |
| JP | 3107779 | 2/2005 |

* cited by examiner

TOOL WITH RATCHET MECHANISM

CROSS-REFERENCE TO RELATED PATENT APPLICATIONS

The present application is a continuation of International Application Number PCT/US2022/043201, filed Sep. 12, 2022, which claims the benefit of and priority to U.S. Provisional Application No. 63/388,027, filed on Jul. 11, 2022, and U.S. Provisional Application No. 63/288,972, filed on Dec. 13, 2021, and U.S. Provisional Application No. 63/243,294, filed on Sep. 13, 2021, which are incorporated herein by reference in their entireties.

BACKGROUND OF THE INVENTION

The present invention relates generally to the field of tools. The present invention relates specifically to a tool with a ratchet mechanism, such as a ratchet, a combo wrench with ratchet mechanism, socket wrench with ratchet mechanism, screw driver with ratchet mechanism, etc. Ratchet mechanisms are used in a variety of tools that use a twisting or rotating motion of the tool, typically to drive a fastener component (e.g., a nut, a bolt, a screw, etc.), and the ratchet mechanism allows the tool or tool handle to be rotated relative to the fastening component to reset the handle position without driving the fastening component and without requiring the tool to be disengaged from the fastening component.

SUMMARY OF THE INVENTION

One embodiment of the invention relates to a driving tool. The driving tool includes a body including a bore, a workpiece engagement surface coupled to the body and a ratchet mechanism supported by the body within the bore and coupled to the workpiece engagement surface. The ratchet mechanism includes a gear coupled to the workpiece engagement surface and including gear teeth. The ratchet mechanism further includes a pawl structure. The pawl structure includes a first pawl with first pawl teeth and a first radially outward facing surface. The pawl structure further includes a second pawl with second pawl teeth and a second radially outward facing surface. The second pawl is placed in series with the first pawl such that the first pawl and second pawl are spaced circumferentially around the gear and configured to engage the gear. The ratchet mechanism includes a biasing assembly coupled to the first pawl and the second pawl. The first pawl includes a medial projection positioned on a surface facing the second pawl. The medial projection extends toward the second pawl and acts as a medial fulcrum. The first pawl further includes a lateral projection positioned on the first radially outward facing surface. The lateral projection extends toward an inner surface of the bore and acts as a lateral fulcrum such that when a force is applied to the first pawl a load is evenly distributed across the first pawl teeth.

Another embodiment of the invention relates to a driving tool. The driving tool includes a body including a bore, a workpiece engagement surface coupled to the body and a ratchet mechanism supported by the body within the bore and coupled to the workpiece engagement surface. The ratchet mechanism includes a gear structure coupled to the workpiece engagement surface and including gear teeth. The ratchet mechanism further includes a pawl structure. The pawl structure includes a first pawl with first pawl teeth and a first radially outward facing surface. The pawl structure includes a second pawl with second pawl teeth and a second radially outward facing surface. The second pawl is placed in series with the first pawl such that the first pawl and second pawl are spaced circumferentially around the gear structure and configured to engage the gear teeth. The ratchet mechanism includes a biasing assembly coupled to the first pawl and the second pawl. The first pawl includes a medial projection positioned on a surface facing the second pawl. The medial projection extends toward the second pawl and acts as a medial fulcrum. The first pawl further includes a lateral projection with an engagement surface positioned on the first radially outward facing surface. The lateral projection extends toward an inner surface of the bore and acts as a lateral fulcrum such that when the first pawl engages the inner surface of the bore the engagement surface of the lateral projection interfaces against the inner surface of the bore.

Another embodiment of the invention relates to a driving tool. The driving tool includes a body including a bore, a workpiece engagement surface coupled to the body and a ratchet mechanism supported by the body within the bore and coupled to the workpiece engagement surface. The ratchet mechanism includes a gear structure coupled to the workpiece engagement surface and including gear teeth. The ratchet mechanism further includes a pawl structure. The pawl structure includes a first pawl with first pawl teeth and a first radially outward facing surface. The pawl structure includes a second pawl with second pawl teeth and a second radially outward facing surface. The second pawl is placed in series with the first pawl such that the first pawl and second pawl are spaced circumferentially around the gear structure and configured to engage the gear teeth. The ratchet mechanism includes a biasing assembly coupled to the first pawl and the second pawl. The first pawl includes a lateral projection with an engagement surface positioned on the first radially outward facing surface. The lateral projection extends toward an inner surface of the bore and acts as a lateral fulcrum such that when the first pawl engages the inner surface of the bore the engagement surface of the lateral projection interfaces against the inner surface of the bore.

Another embodiment of the invention relates to a driving tool. The driving tool includes a body including a bore, a workpiece engagement surface coupled to the body and a ratchet mechanism supported by the body within the bore and coupled to the workpiece engagement surface. The ratchet mechanism includes a gear structure coupled to the workpiece engagement surface and including gear teeth. The ratchet mechanism further includes a pawl structure. The pawl structure includes a first pawl with first pawl teeth and a first radially outward facing surface. The pawl structure includes a second pawl with second pawl teeth and a second radially outward facing surface. The second pawl is placed in series with the first pawl such that the first pawl and second pawl are spaced circumferentially around the gear structure and configured to engage the gear teeth. The ratchet mechanism includes a biasing assembly coupled to the first pawl and the second pawl. The first pawl includes a medial projection positioned with an engagement surface positioned on a surface facing the second pawl. The medial projection extends toward the second pawl and acts as a medial fulcrum such that when the second pawl engages the first pawl, the engagement surface of the medial projection interfaces against the second radially outward facing surface.

Another embodiment of the invention relates to a driving tool. The driving tool includes a body, a workpiece engagement surface coupled to the body and a ratchet mechanism supported by the body and coupled to the workpiece engagement surface. The ratchet mechanism includes a gear structure coupled to the workpiece engagement surface. The gear structure includes a top portion including gear teeth and a bottom portion including gear teeth. A circumferential distance between adjacent gear teeth defines a gear tooth spacing. The ratchet mechanism further includes a pawl structure. The pawl structure includes a first pawl having first pawl teeth and a second pawl having second pawl teeth. The second pawl is placed in series with the first pawl such that the first pawl and the second pawl are spaced circumferentially around the gear structure and configured to engage the top portion of the gear structure. The pawl structure further includes a third pawl having third pawl teeth and a fourth pawl having fourth pawl teeth. The fourth pawl is placed in series with the third pawl such that the third pawl and the fourth pawl are spaced circumferentially around the gear structure and configured to engage the bottom portion of the gear structure. A circumferential distance between adjacent pawl teeth defines a pawl tooth spacing. The ratchet mechanism includes a biasing assembly coupled to the first pawl, the second pawl, the third pawl and the fourth pawl. The gear teeth of the bottom portion are rotationally offset from the gear teeth of the top portion by ½ of a gear tooth spacing. The first pawl teeth are rotationally offset from the second pawl teeth by ¼ of a pawl tooth spacing. The third pawl teeth are rotationally offset from the fourth pawl by ¼ of a pawl tooth spacing.

Another embodiment of the invention relates to a driving tool. The driving tool includes a body a workpiece engagement surface coupled to the body and a ratchet mechanism supported by the body within a bore and coupled to the workpiece engagement surface. The ratchet mechanism includes a gear coupled to the workpiece engagement surface, the gear having gear teeth. The ratchet mechanism further includes a pawl structure. The pawl structure includes a first pawl having first pawl teeth and a first radially outward facing surface. A plurality of root surfaces are positioned between the first pawl teeth. Each root surface is positioned between a counterclockwise facing surface of a first pawl tooth and a leading surface of an adjacent first pawl tooth. The pawl structure further includes a second pawl having second pawl teeth and a second radially outward facing surface. The second pawl is placed in series with the first pawl such that the first pawl and the second pawl are spaced circumferentially around the gear and configured to engage the gear. A plurality of root surfaces are positioned between the second pawl teeth. Each root surface is positioned between a counterclockwise facing surface of a second pawl tooth and a leading surface of an adjacent second pawl tooth. The ratchet mechanism includes a biasing assembly coupled to the first pawl and the second pawl. A first pawl tooth angle is defined between a first plane that bisects the root surface the leading surface of the adjacent first pawl tooth. A second pawl tooth angle is defined between a second plane that bisects the root surface and the leading surface of the adjacent second pawl tooth.

Another embodiment of the invention relates to a driving tool. The driving tool includes a body, a workpiece engagement surface coupled to the body and a ratchet mechanism supported by the body and coupled to the workpiece engagement surface. The ratchet mechanism includes a gear structure coupled to the workpiece engagement surface. The gear structure includes a top portion including gear teeth and a bottom portion including gear teeth. A circumferential distance between adjacent gear teeth defines a gear tooth spacing. The ratchet mechanism further includes a pawl structure. The pawl structure includes a first pawl having first pawl teeth and a second pawl having second pawl teeth. The second pawl is placed in series with the first pawl such that the first pawl and the second pawl are spaced circumferentially around the gear structure and configured to engage the top portion of the gear structure. The pawl structure further includes a third pawl having third pawl teeth and a fourth pawl having fourth pawl teeth. The fourth pawl is placed in series with the third pawl such that the third pawl and the fourth pawl are spaced circumferentially around the gear structure and configured to engage the bottom portion of the gear structure. A circumferential distance between adjacent pawl teeth defines a pawl tooth spacing. The ratchet mechanism includes a biasing assembly coupled to the first pawl, the second pawl, the third pawl and the fourth pawl. The gear teeth of the bottom portion are rotationally offset from the gear teeth of the top portion by ¼ of a gear tooth spacing. The first pawl teeth are rotationally offset from the second pawl teeth by ½ of a pawl tooth spacing. The third pawl teeth are rotationally offset from the fourth pawl by ½ of a pawl tooth spacing.

Another embodiment of the invention relates to a tool. The tool includes a tool body including workpiece engagement surfaces and a ratcheting mechanism coupled to the workpiece engagement structure. The ratcheting mechanism includes a gear structure having a plurality of gear teeth and at a first and second pawl placed in series. The first and second pawls are spaced circumferentially around the gear. In such embodiments, each pawl includes teeth rotationally offset from each other. In a specific embodiment, the ratchet mechanism further includes a third and fourth pawl forming a layer of pawls stacked below the first and second pawls, where the pawls are also in series or spaced circumferentially around the gear. In another specific embodiment, the biasing member the ratchet mechanism may be a single integral piece of material, such that all four pawls are spring loaded by a single biasing member.

In specific embodiments, the ratchet mechanism includes a gear or sprocket and pawls with two sets of teeth. One set of central pawl teeth engage when the pawl is loaded towards the center, while the second side set of teeth engage when the ratchet mechanism is flipped and engaged towards the side. The central and side teeth are offset to increase the number of circumferentially spaced gear teeth available to engage with the pawl teeth.

In specific embodiments, the ratchet mechanism includes a pawl that is stationary while a gear or sprocket is floating within the tool head under loading of a biasing member. In another specific embodiment, the pawl is a pair of stationary pawls stacked to engage the biased gear.

In specific embodiments, the ratchet mechanism includes a first or front pawl and a second or central pawl positioned in series. The front pawl includes a lateral fulcrum that engages with the bore of the tool body and a medial fulcrum that engages with the central pawl. The position of the medial and lateral fulcrums are configured to allow for even load distribution across the pawl teeth. In another specific embodiment, the pawl includes a steeper pawl tooth configured to allows for increased load capacity of the pawl.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
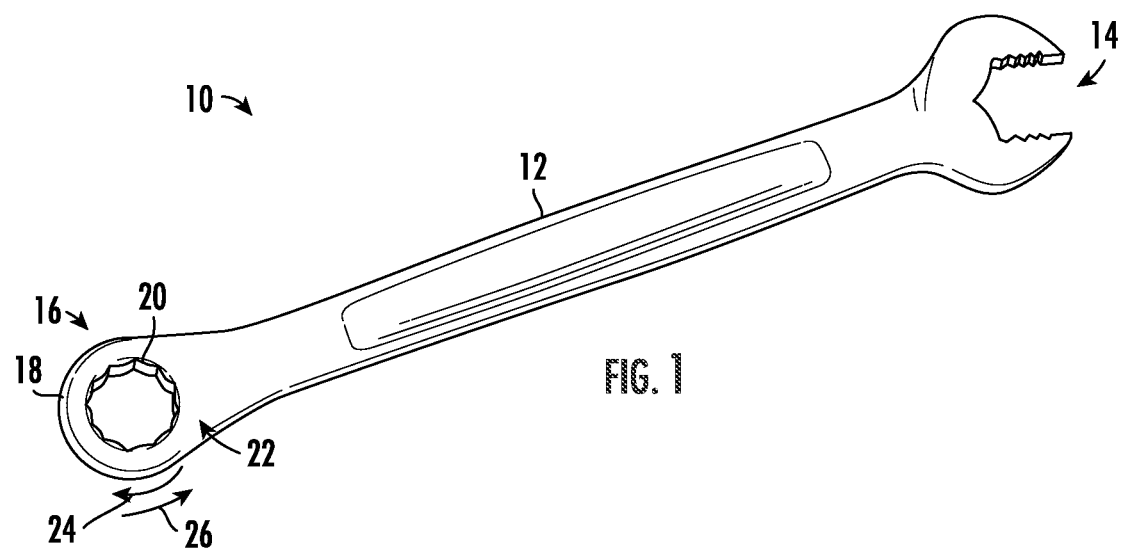
FIG. 1 is a perspective view of a tool including a ratcheting mechanism, according to an exemplary embodiment.

Referring generally to the figures, various embodiments of a ratchet mechanism for a tool are shown and described. In general, ratchet mechanisms are used in a variety of tools that deliver torque to a workpiece such as a component of fastener (e.g., a nut, a bolt, a screw, etc.). In various embodiments, various embodiments of the ratchet mechanism discussed herein provide a high level of engagement between components of the ratchet mechanism during driving rotation (e.g., restricted rotation in which the ratchet mechanism transfers torque from the tool body/tool handle to the workpiece) such that forces are distributed across multiple engagement surfaces during use. In addition, the components of various embodiments of the ratchet mechanisms are configured relative to the tool body such that the tool body provides a high level of support to the components of the ratchet mechanism during driving. Both the tool body support and the high level of ratchet component engagement are believed to provide a ratchet mechanism with a high level of durability.

In an exemplary embodiment, the ratchet mechanism includes a gear or sprocket formed from multiple layers of similarly shaped annular structures stacked on top of each other. The ratchet mechanism further includes multiple layers of pawls stacked on top of each other. In such embodiments, each layer of the gear stack includes teeth rotationally offset from each other. This rotational offset increases the number of circumferentially spaced gear tooth surfaces that are available to engage with the pawl teeth, which in turn decreases the amount of backlash.

In another exemplary embodiment, the ratchet mechanism includes a gear or sprocket with multiple pawls placed in series. The pawls are spaced circumferentially around the gear. In such embodiments, each pawl includes teeth rotationally offset from each other. This rotational offset increases the number of circumferentially spaced pawl surfaces that are available to engage with the gear teeth, which in turn decreases the amount of backlash.

In a specific embodiment, the ratchet mechanism includes a gear or sprocket formed from multiple layers of similarly shaped annular structures stacked on top of each other. The ratchet mechanism further includes layers of pawls stacked on top of each other where the pawls are also in series or spaced circumferentially around the gear. In such embodiments, each layer of the gear stack includes teeth rotationally offset from each other in addition to the pawls being rotationally offset from each other. This combination of rotational offsets increases the number of circumferentially spaced gear tooth surfaces that are available to engage with the pawl teeth, which in turn decreases the amount of backlash. In a specific embodiment, the biasing member of the ratchet mechanism may be a single integral piece of material (e.g., metal) such that all four pawls are spring loaded by a single biasing member. The single biasing member improves efficiency and ease of assembly of the tool.

In another specific embodiment, the ratchet mechanism includes a gear or sprocket formed from multiple layers of similar shaped annular structures stacked on top of each other. The ratchet mechanism further includes multiple layers of pawls stacked on top of each other where the pawls are also in series or spaced circumferentially around the gear. The ratchet mechanism includes a switching mechanism such that the ratchet mechanism is reversible, allowing tightening in both the clockwise and counterclockwise direction.

In an exemplary embodiment, the ratchet mechanism includes a gear or sprocket and pawls with two sets of teeth. One set of the pawl teeth engage when the pawl is loaded towards the center, while the second set of teeth engage when the ratchet mechanism is flipped and engaged towards the side. The central and side teeth are offset to increase the number of circumferentially spaced gear teeth available to engage with the pawl teeth while maintaining a small arc swing.

In an exemplary embodiment, the ratchet mechanism includes a pawl or stacked pawls that are stationary while a gear or sprocket is floating within the tool head under loading of a biasing member.

Referring to FIG. 1, a tool, such as wrench 10, is shown according to an exemplary embodiment. In the embodiment shown, wrench 10 is a combination wrench including a tool body 12, an open wrench end 14 and a ratchet head or end 16. Ratchet head 16 is formed from a generally ring-shaped portion 18 of tool body 12 that surrounds and supports wrench engagement surfaces 20. As will be understood, in use, wrench engagement surfaces 20 engage a component of a workpiece (e.g., a fastener, a bolt, a nut, etc.) and a tool body 12 acts as a handle and a lever to apply torque to the component. Wrench 10 includes a ratchet mechanism 22 that is supported within a tool body 12 and ratchet mechanism 22 provides ratcheting action to wrench engagement surfaces 20.

In general, ratchet mechanism 22 is a mechanical structure that allows for free or unrestricted rotation of tool body 12 around engagement surfaces 20 in a first direction, shown as arrow 24, and allows for restricted or driving rotation of tool body 12 around engagement surfaces 20 in a second direction 26. In general, during rotation in the unrestricted direction 24, ratchet mechanism 22 allows tool body 12 to rotate around engagement surfaces 20 (and around a fastening component located within engagement surfaces 20) without transferring torque to engagement surfaces 20, and during rotation in the restricted direction 26, ratchet mechanism 22 prevents tool body 12 from freely rotating around engagement surfaces 20 (and around a fastening component located within engagement surfaces 20) such that torque applied to tool body 12 is transferred to engagement surfaces 20 and to the fastening component located within engagement surfaces 20. In some embodiments, as discussed below, tool 10 includes a reversible ratchet mechanism having a switch that allows a user to switch or select which rotational direction is the driving direction and which rotational direction is the unrestricted direction.

Figure 2:
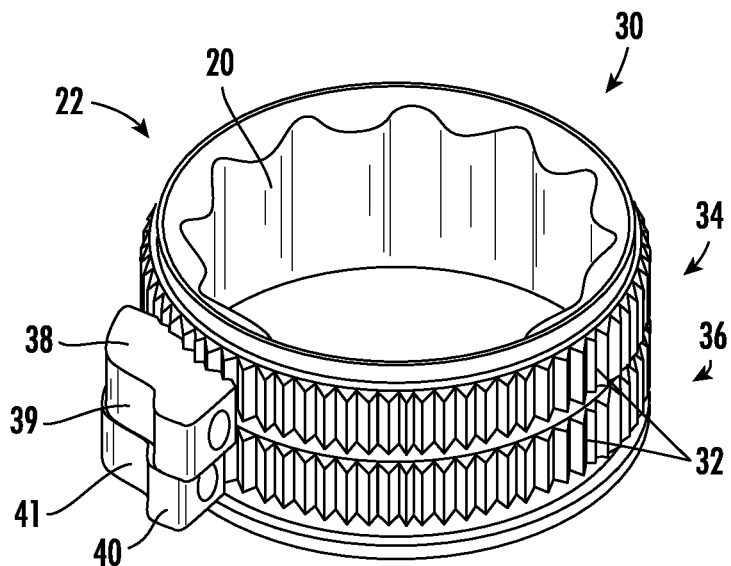
FIG. 2 is a perspective view of a ratchet mechanism of the tool of FIG. 1, according to an exemplary embodiment.
Figure 3:
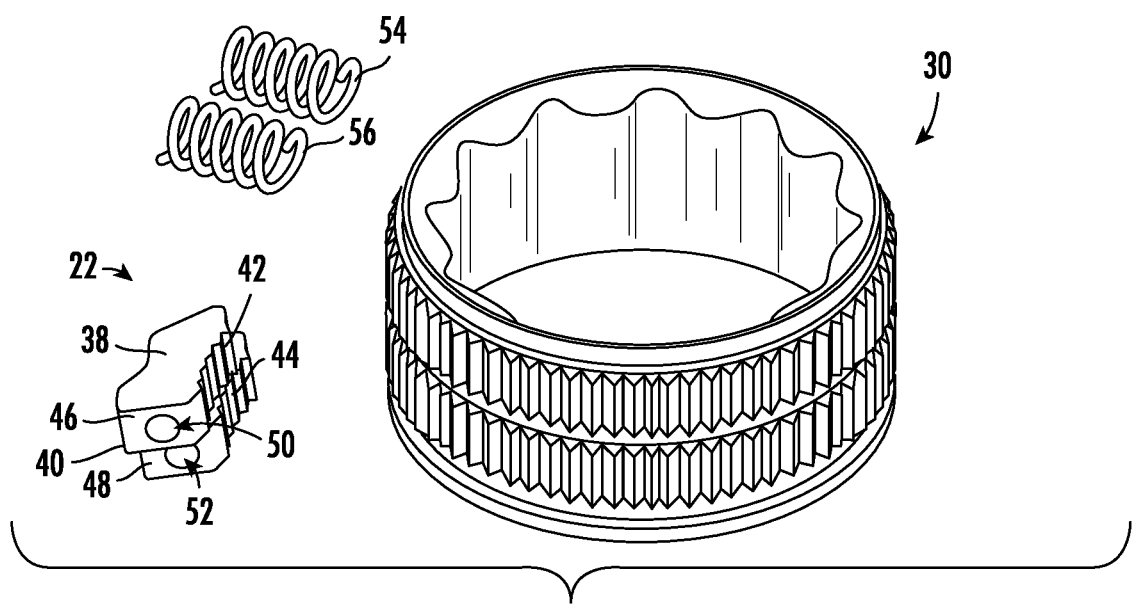
FIG. 3 is an exploded view of the ratchet mechanism of FIG. 2, according to an exemplary embodiment.
Figure 4:
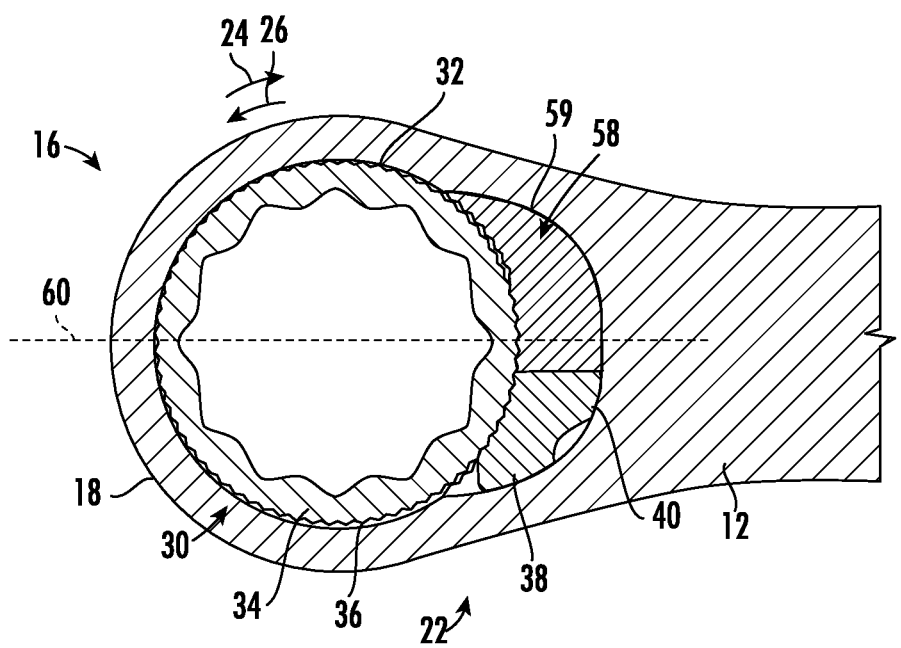
FIG. 4 is a cross-sectional view of a ratcheting tool of FIG. 1 showing the ratcheting mechanism of FIG. 2 mounted within a tool body, according to an exemplary embodiment.

Referring to FIGS. 2-4, components of ratchet mechanism 22 are shown in detail. In the orientation of FIGS. 2-4, ratchet mechanism 22 includes a sprocket or gear 30. Gear 30 is a generally ring or annularly shaped structure that includes an inner surface that defines an opening in which engagement surfaces 20 are located. The outer surface of gear 30 includes an upper or first portion 34 stacked on a lower or second portion 36. Upper portion 34 and lower portion 36 of gear 30 each include a plurality of teeth 32 which face radially outward from gear 30. The teeth 32 of upper portion 34 are offset from the teeth 32 of lower portion 36.

Ratchet mechanism 22 includes an engagement structure shown, as upper or first pawl 38 and lower or second pawl 40 stacked below upper pawl 38. Upper and lower pawls 38, 40 include an upper radially outward facing surface 39 and a lower radially outward facing surface respectively 41. Upper and lower radially outward facing surfaces 39, 41 extend in a generally circumferential direction. Upper pawl 38 and lower pawl 40 each include a plurality of teeth 42, 44 opposite of the upper and lower radially outward facing surfaces 39, 41. Upper pawl 38 and lower pawl 40 further include a clockwise facing surface 46, 48 with a recess 50, 52 to receive a biasing member, shown as springs 54, 56. Springs 54, 56 are received within recesses 50, 52 and bias and/or move upper pawl 38 and lower pawl 40 into engagement, providing the biasing and flexibility needed to provide the ratcheting movement discussed herein.

Referring to FIG. 4, details of the ratchet mechanism 22 relative to the tool body 12 are shown. Tool body 12 defines a lengthwise or medial axis 60. In general, upper pawl 38 and lower pawl 40 are positioned on one side of the medial axis 60. Tool body 12 includes a recess 58 shaped to receive upper and lower pawls 38, 40. Upper and lower radially outward facing surfaces 39, 41 face and engage with an inner surface 59 of recess 58.

As tool body 12 is rotated in the direction of arrow 24, teeth 42 of upper pawl 38 and teeth 44 of lower pawl 40 engage with gear teeth 32 of the upper portion 34 and lower portion 36 respectively. The spacing and shape or pawl teeth 42, 44 relative to gear teeth 32 cause upper pawl 38 and lower pawl 40 to deflect after engagement between pawl teeth 42, 44 and gear teeth 32. Springs 54, 56 bias upper pawl teeth 42 and lower pawl teeth 44 into the space before the next gear tooth 32 on upper portion 34 and lower portion 36 of gear 30. The multiple sets of pawl teeth 42, 44 allow for better/even load distribution across the pawl teeth surfaces during driving engagement (i.e., when the tool is rotated in the direction of arrow 26).

Upon continued rotation in direction 24, while pawl teeth 42 and pawl teeth 44 each engage and slide over the adjacent gear tooth 32 of the upper portion 34 or lower portion 36 of gear 30. Due to the spacing and relative shape of pawl teeth 42, 44 and gear teeth 32, springs 54, 56 bend or deflect upon engagement between pawl teeth 42, 44 and gear teeth 32 during rotation in direction 24. Once pawl teeth 42, 44 pass over the clockwise adjacent gear tooth, the elasticity/spring action of springs 54, 56 biases pawl teeth 42, 44 into the space located before the next gear tooth 32, as rotation in direction 24 continues.

When a user stops rotation in direction 24 and begins rotation of tool body in the direction of arrow 26 a workpiece can be engaged and driven. In various embodiments, the pawl teeth 42, 44 have a relative spacing to each other such that the maximum backlash distance is reduced (i.e., the maximum distance a leading pawl tooth must travel before engagement with a gear tooth 32 during driving rotation, e.g., in the direction of arrow 26). In a specific embodiment, lower pawl 40 is spaced from upper pawl 38 to engage gear teeth 32 at increments between ¼ and ¾ of a tooth arc length/width, specifically between ⅜ and ⅝ of the tooth arc length/width and more specifically ½ a tooth arc length/width. In specific embodiments, the angular spacing between the teeth of lower pawl 40 and upper pawl 38 is between 1 degree and 4 degrees, specifically between 2 degrees and 3 degrees and more specifically is 2.5 degrees. The offset of upper pawl 38 teeth 42 and lower pawl 40 teeth 44 allows for reduced rotational distance and time before tooth engagement occurs.

Figure 5:
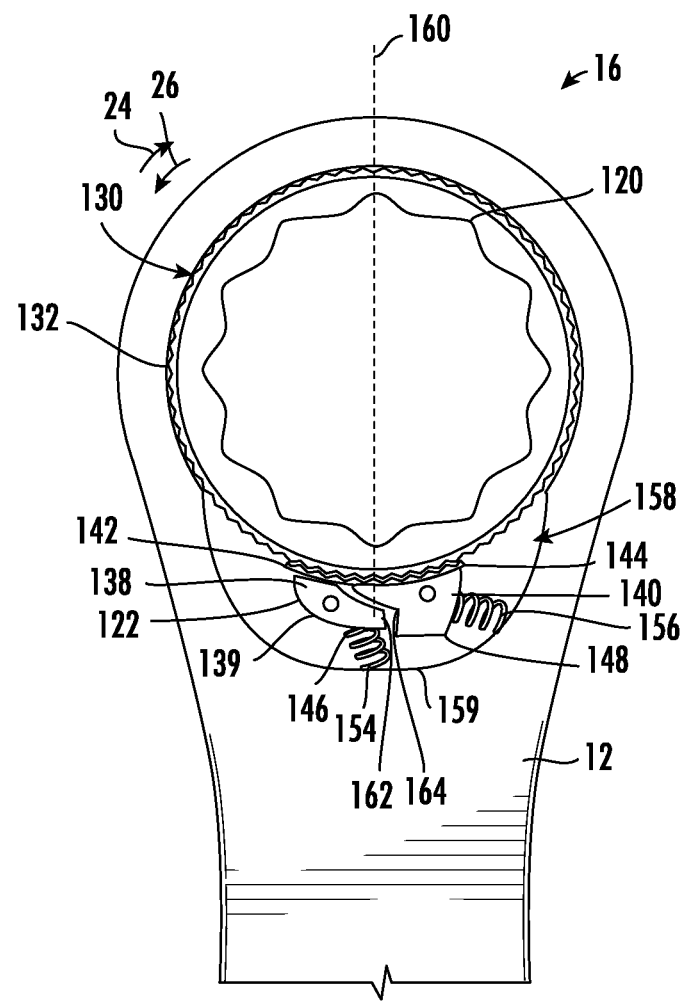
FIG. 5 is a top plan view showing a ratcheting mechanism mounted within a tool body, according to another exemplary embodiment.
Figure 6:
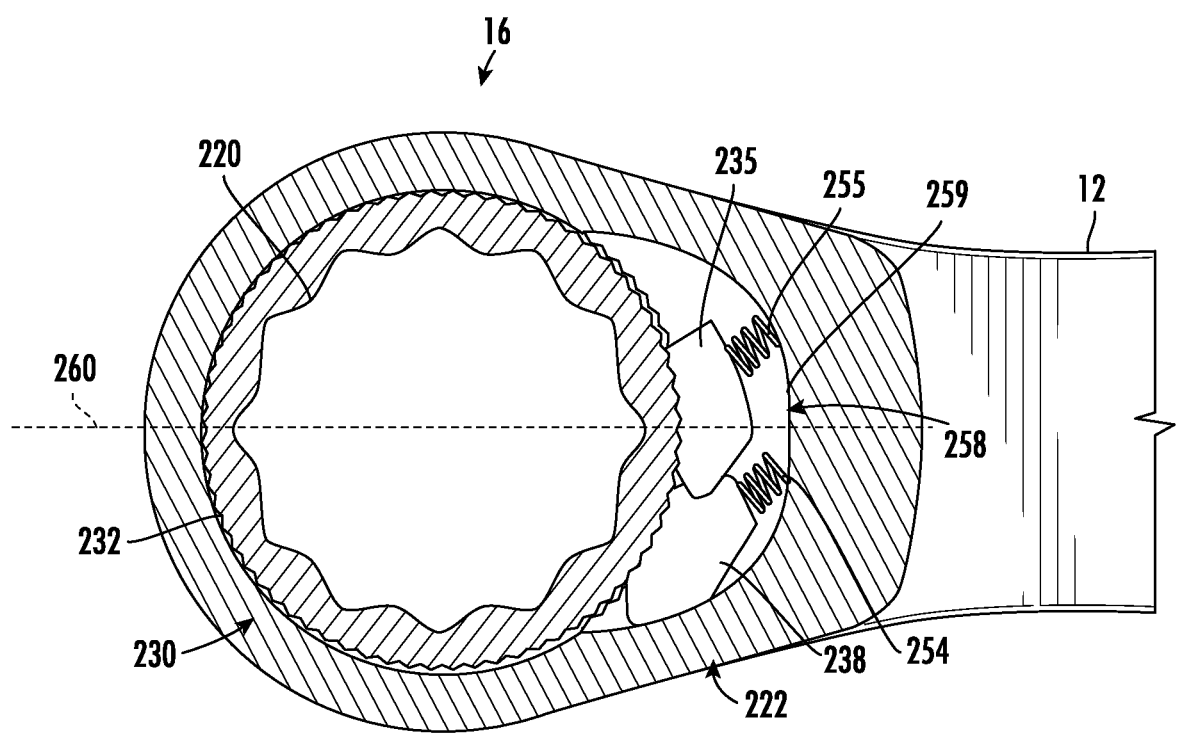
FIG. 6 is a cross-sectional view of a ratcheting tool of FIG. 1, showing a ratcheting mechanism mounted within the tool body, according to another exemplary embodiment.

Referring to FIG. 5, another embodiment including a ratchet mechanism 122, that can be utilized with wrench 10 is shown. As shown in FIG. 5, ratchet mechanism 122 includes a sprocket or gear 130. Gear 130 is a generally ring or annularly shaped structure that includes an inner surface that defines an opening in which engagement surfaces 120 are located. In a specific embodiment, gear 130 includes a single layer of teeth, shown schematically as gear teeth 132 which face radially outward from gear 130.

Ratchet mechanism 122 includes an engagement structure shown as first pawl 138 and second pawl 140 positioned in series (i.e., spaced circumferentially around gear 130 rather than stacked) with first pawl 138. First pawl 138 has a radially outward facing surface 139 with a geometry that matches inner surface 159 of recess 158 that receives first and second pawls 138, 140. First pawl 138 further includes a medial engagement surface 162 positioned proximate the medial axis 160 of wrench 10. Medial engagement surface 162 is abutted by engagement surface 164 of second pawl 140. This arrangement wedges first pawl 138 between gear 130 and inner surface 159 similar to a standard ratchet mechanism. Second pawl 140 wedges between first pawl 138 positioned against inner surface 159 and gear 130.

First pawl 138 and second pawl 140 each include a plurality of teeth 142 and 144 opposite of the radially outward facing surfaces of pawls 138 and 140. Radially outward facing surface 139 of first pawl 138 receives a biasing member shown as spring 154. Second pawl 140 further include a clockwise facing surface 148 that receives a biasing member, shown as spring 156. Springs 154, 156 bias first pawl 138 and second pawl 140 into engagement, providing the biasing and flexibility needed to provide the ratcheting movement discussed herein.

Ratchet mechanism 122 is similar to ratchet mechanism 22 in that during rotation in the unrestricted direction 24, ratchet mechanism 122 allows tool body 12 to rotate around engagement surfaces 120 (and around a fastening component located within engagement surfaces 120) without transferring torque to engagement surfaces 120. During rotation in the restricted direction 26, ratchet mechanism 122 prevents tool body 12 from freely rotating around engagement surfaces 120 (and around a fastening component located within engagement surfaces 120) such that torque applied to tool body 12 is transferred to engagement surfaces 120 and to the fastening component located within engagement surfaces 120. In a specific embodiment, first pawl 138 is spaced from second pawl 140 to engage gear teeth 132 at increments between ¼ and ¾ of a tooth arc length/width, specifically between ⅜ and ⅝ of the tooth arc length/width and more specifically ½ a tooth arc length/width. First pawl 138 and second pawl 140 engaging gear 130 at half tooth increments creates 144 pawl/gear engagements.

Referring to FIGS. 6-9, another embodiment including a ratchet mechanism 222, that can be utilized with wrench 10 is shown. In general, ratchet mechanism 222 is substantially the same as ratchet mechanism 122 except for the differences discussed herein. Ratchet mechanism 222 includes a sprocket or gear 230. Gear 230 is a generally ring or annularly shaped structure that includes an inner surface that defines an opening in which engagement surfaces 220 are located. In a specific embodiment, gear 230 includes stacked layers including a plurality of teeth 232 which face radially outward from gear 130. The outer surface of gear 230 includes an upper or first portion 234 stacked on a lower or second portion 236. The teeth 232 of upper portion 234 are offset from the teeth 232 of lower portion 236.

Ratchet mechanism 222 includes an engagement structure shown, as upper or first pawl 238 and lower or second pawl 240 stacked below upper pawl 238. First and second pawls 238, 240 include an upper radially outward facing surface 239 and a lower radially outward facing surface respectively 241. Upper and lower radially outward facing surfaces 239, 241 extend in a generally circumferential direction. First pawl 238 and second pawl 240 each include a plurality of teeth 242, 265 opposite of the upper and lower radially outward facing surfaces 239, 241. First and second pawls 238, 240 each further include a biasing surface 246 and 248 respectively that define a bore 250 to receive a biasing element, shown as springs 254 and 256.

Ratchet mechanism 222 includes a third pawl 235 and a fourth pawl 237 positioned in series (i.e., spaced circumferentially around gear 230 rather than stacked) with first pawl 238 and second pawl 240 respectively. Third and fourth pawls 235, 237 include a second upper radially outward facing surface 262 and a second lower radially outward facing surface 264. Second upper radially outward facing surface 262 and second lower radially outward facing surface 264 each include a bore 252 to receive a biasing element, shown as springs 255 and 257. Third and fourth pawls 235, 237 each include a plurality of teeth 244, 266 opposite of the second upper and second lower radially outward facing surfaces 262, 264.

Surfaces 239 and 241 of first and second pawls 238, 240 have a geometry that matches inner surface 259 of recess 258 that receives first, second, third and fourth pawls 138, 240, 235, 237. First pawl 238 further includes a medial engagement surface 268 positioned proximate the medial axis 260 of wrench 10. Medial engagement surface 268 is shaped to receive and fully engage a curved engagement surface 270 of third pawl 235 (i.e., medial engagement surface 268 has a corresponding shape to match curved engagement surface 270 and engage along the entire surfaces). Second pawl 240 further includes a medial engagement surface 269 positioned proximate the medial axis 260 of wrench 10. Medial engagement surface 269 is shaped to receive and fully engage a curved engagement surface 271 of fourth pawl 237. In a specific embodiment, the increments of engagement between the pawl teeth and gear teeth are between 1/16 and 1/2 of a tooth arc length/width, specifically between 1/8 and 3/8 of the tooth arc length/width and more specifically 1/4 a tooth arc length/width. In a specific embodiment, this arrangement including a combination of stacking and the wedge used in ratchet mechanism 122 creates quarter tooth increments of engagement such that there are 288 pawl/gear engagement positions.

Figure 10:
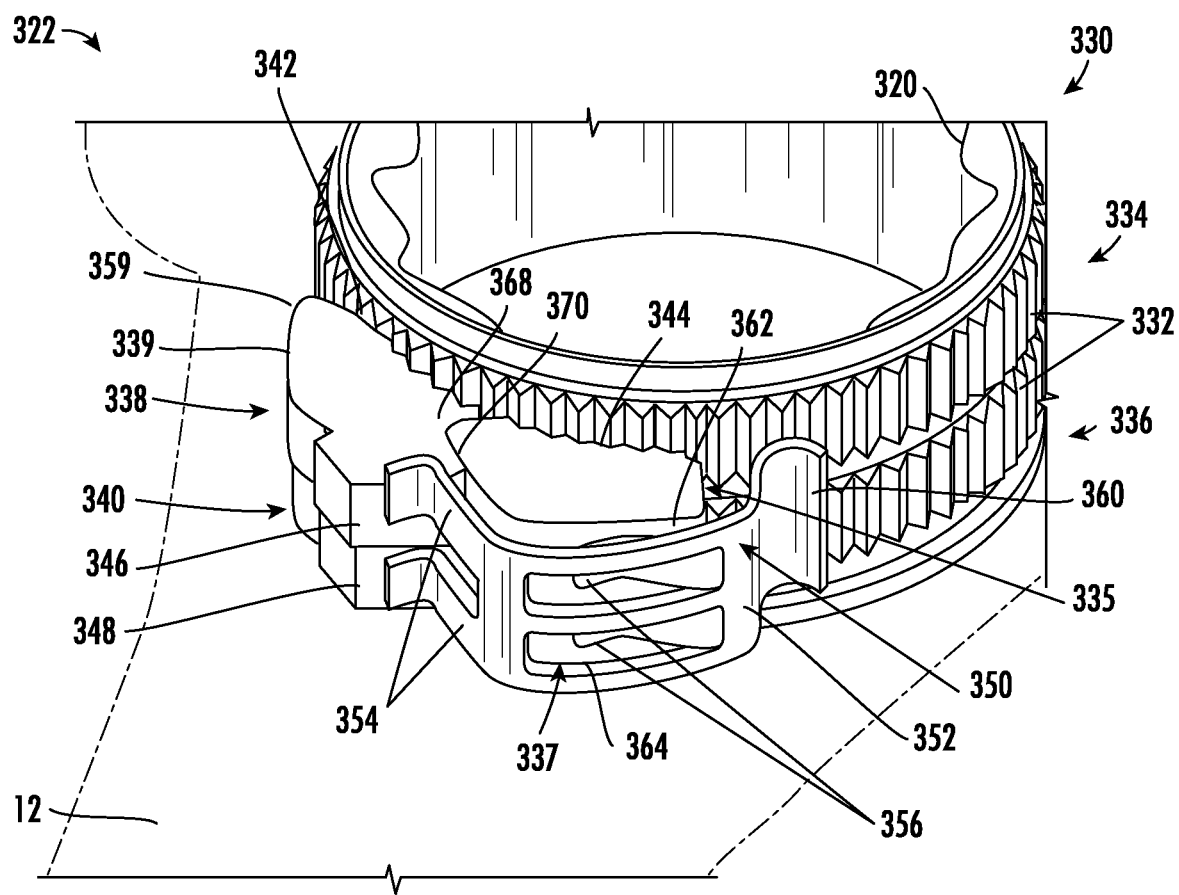
FIG. 10 is a perspective view of a ratcheting tool of FIG. 1, showing a ratcheting mechanism mounted within the tool body, according to another exemplary embodiment.
Figure 11:
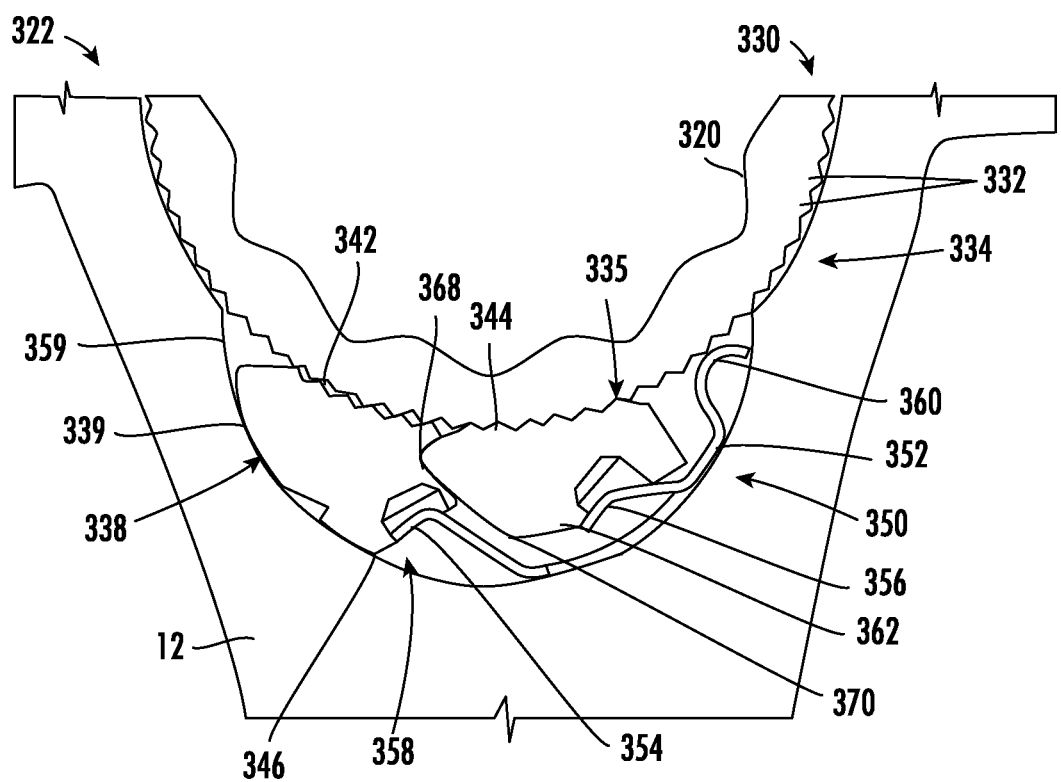
FIG. 11 is a detailed plan view showing the ratcheting mechanism of FIG. 10, according to an exemplary embodiment.

Referring to FIGS. 10-11, another embodiment including a ratchet mechanism 322 that can be utilized with wrench 10 is shown. In general, ratchet mechanism 322 is substantially the same as ratchet mechanism 222 except for the differences discussed herein. Ratchet mechanism 322 includes a biasing member 350 configured to bias all four pawls 338, 340, 335, 337. The biasing member 350 is a single integral piece of material (e.g., metal). In a specific embodiment, biasing member 350 may be formed through a stamping process. As shown in FIG. 10, all four pawls 338, 340, 335, 337 are spring loaded by single biasing member 350. The single biasing member improves efficiency and ease of assembly of the tool.

Biasing member 350 includes a body 352, four arms 354, 356 and a curved end 360. A first pair of biasing arms 354 engage with first and second pawls 338 and 340 along first and second biasing surfaces 346 and 348. A second pair of biasing arms 356 engage third and fourth pawls 335 and 357 along third and fourth biasing surfaces 362 and 364. Curved end 360 of biasing member 350 extends from body 352 into a radially outward facing curve that engages inner surface 359 of bore 358.

Figure 12:
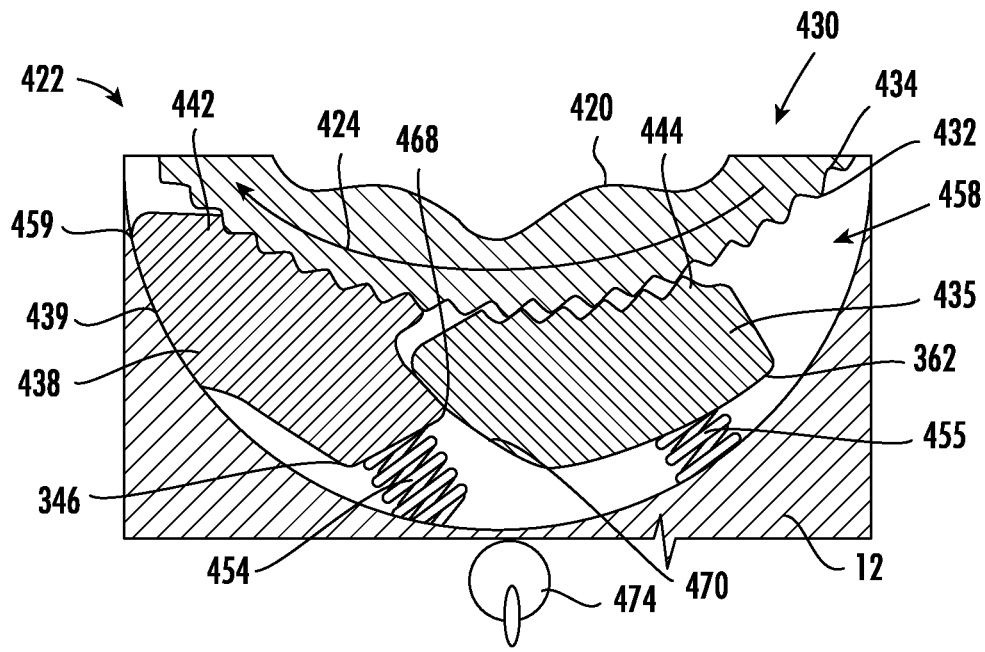
FIG. 12 is a detailed plan view showing an upper portion of a reversible ratcheting mechanism, according to an exemplary embodiment.
Figure 13:
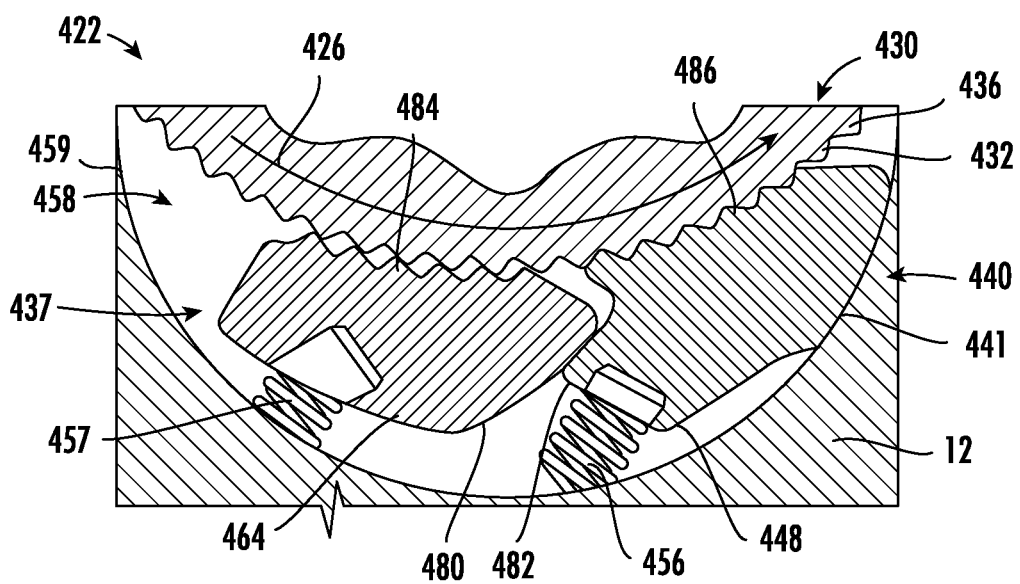
FIG. 13 is a detailed plan view showing a lower portion of the reversible ratcheting mechanism of FIG. 12, according to an exemplary embodiment.

Referring to FIGS. 12-13, another embodiment including a ratchet mechanism 422, that can be utilized with wrench 10 is shown. In general, ratchet mechanism 322 is substantially the same as ratchet mechanism 222 except for the differences discussed herein. FIG. 12 shows an upper portion of the ratcheting mechanism 422 while FIG. 13 shows the arrangement of the lower portion of ratcheting mechanism 222. In another embodiment, the arrangement of the pawls may be switched such that the lower portion of the mechanism are positioned as shown in FIG. 12 and the upper portion of the mechanism are positioned as shown in FIG. 13. Ratcheting mechanism 422 further includes a switch, shown schematically as element 474. When a user pushes switch 474 into a reversed position, the bottom portion of ratcheting mechanism 422 becomes engaged.

In the reversed arrangement, second pawl 440 becomes wedged against the opposite portion of inner surface 459 from first pawl 438 with fourth pawl 437 acting as the wedge with medial engagement surface 480 interfacing with medial engagement surface 482 of second pawl 440. In a specific embodiment, the increments of engagement between the pawl teeth and gear teeth are between 1/4 and 3/4 of a tooth arc length/width, specifically between 3/8 and 5/8 of the tooth arc length/width and more specifically 1/2 a tooth arc length/width. In a specific embodiment, this arrangement including the stacking and the series wedges used in ratchet mechanism 222 combined with a switch creating a reversible mechanism including half tooth increments of engagement such that there are 144 pawl/gear engagement positions.

Figure 14:
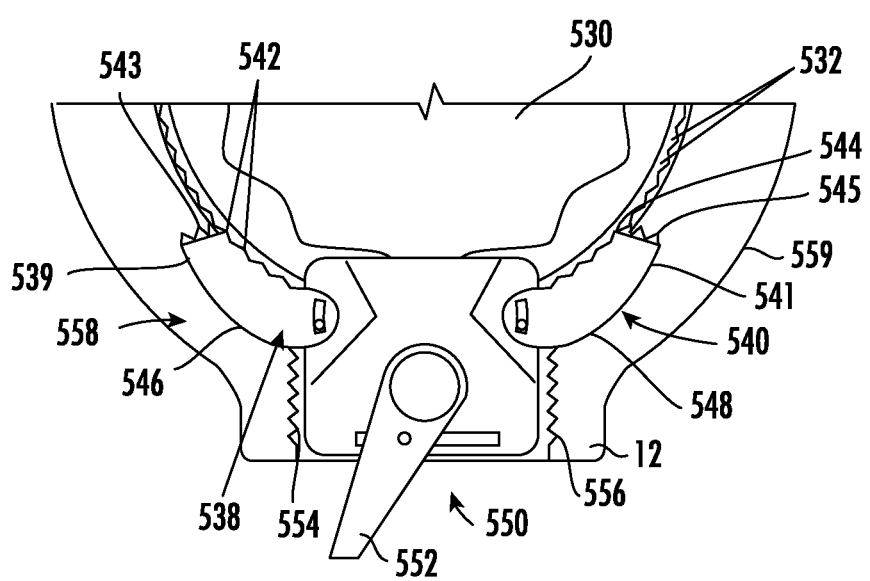
FIG. 14 is a top plan view showing a reversible ratcheting mechanism, according to another exemplary embodiment.

Referring to FIG. 14, another embodiment including a ratchet mechanism 522, that can be utilized with wrench 10 is shown. Ratchet mechanism 522 can be used with both a reversible and non-reversible ratchet. FIG. 14 shows switch mechanism 550 with lever 552 in the reversed position. Ratchet mechanism 522 includes a first pawl 538 with a central plurality of teeth 542 and a side plurality of teeth 543. Second pawl 540 similarly includes a central plurality of teeth 544 and a side plurality of teeth 545. When central teeth 544 of second pawl 540 are engaged with the gear teeth 532 (gear shown schematically as 530), the side teeth 543 of first pawl 538 are also engaged. Similarly, when central teeth 542 of first pawl 538 are engaged with gear teeth 532, the side teeth 545 of second pawl 540 are engaged with gear teeth 532.

First and second pawls 538, 540 include a first upper radially outward facing surface 539 and a second radially outward facing surface 241. First and second outward facing surfaces 539, 541 extend in a generally circumferential direction. First pawl 538 and second pawl 540 each include a plurality of central teeth 542, 544 opposite of the first and second radially outward facing surfaces 539, 541. First and second pawls 538, 540 each further include a biasing surface 546 and 548 respectively that define a bore to receive a biasing element, shown as springs 554 and 556. In a specific embodiment, the central and side teeth of first and second pawls 538, 540 engage gear teeth 532 at increments between 1/2 and 6/2 of a tooth arc length/width, specifically between 1/2 and 3/2 of the tooth arc length/width and more specifically 1 tooth arc length/width. In a specific embodiment, the central and side teeth are offset by one tooth to obtain 144 pawl/gear engagement positions while maintaining a 2.5° arc swing.

Figure 15:
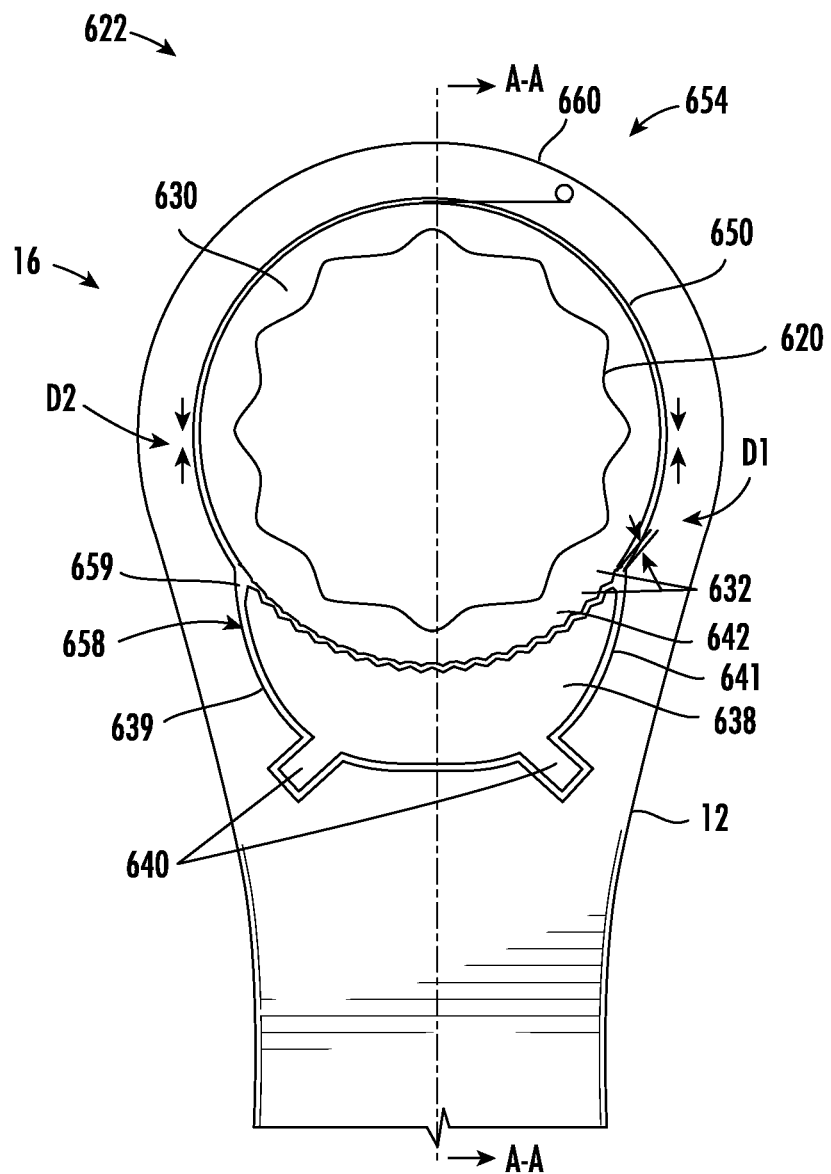
FIG. 15 is a top plan view of a tool including a ratcheting mechanism, according to another exemplary embodiment.
Figure 16:
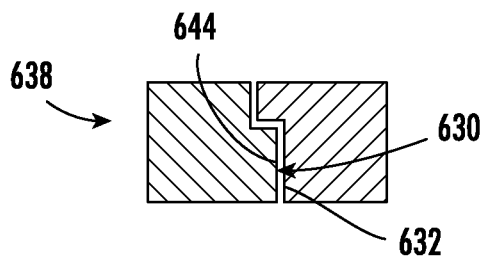
FIG. 16 is cross-sectional view showing engagement between the gear and pawl of the ratcheting mechanism of FIG. 15, according to an exemplary embodiment.

Referring to FIGS. 15-16, another embodiment including a ratchet mechanism 622, that can be utilized with wrench 10 is shown. Ratchet mechanism 622 includes a gear 630 floating within ratchet head 16 of wrench 10 and spring loaded by a biasing element 654 (e.g., leaf spring or diving board) such that the gear 630 applies a load back into the direction of a pawl 638 to engage pawl 638. Ratchet head 16 includes an inner surface 650 surrounding gear 630.

Pawl 638 is stationary and centered on the medial axis 660 of tool body 12. Ratchet head 16 includes a bore 658 to receive pawl 638. Bore 658 includes an inner surface 659 that interacts with a first side surface 639 and an opposing side surface 641 of pawl 638. Pawl 638 includes two projections 640 opposing pawl teeth 642 that distribute the load from gear 630. In a specific embodiment, the tooth angle is less than 90° to prevent the engagement between gear 630 and pawl 638 from slipping. The tooth profile of gear 630 is defined as D1. A slot or space between gear 630 and tool body 12 is defined as D2. D2 is greater than D1 such that gear 630 can be biased by biasing element 654 into engagement with pawl 638.

In one embodiment, gear 630 includes a single layer and pawl 638 includes a single layer of pawl teeth 642. In another embodiment, gear 630 may include a top portion with a plurality of teeth 632 and a bottom portion with a plurality of teeth 632 to engage a top and bottom pawl.

Referring to FIG. 16, a cross-sectional view showing engagement between a gear tooth 632 and pawl tooth 644 is shown, according to an exemplary embodiment. Pawl tooth 644 is engaged with gear tooth 632 is a top and bottom type of engagement.

Figure 17:
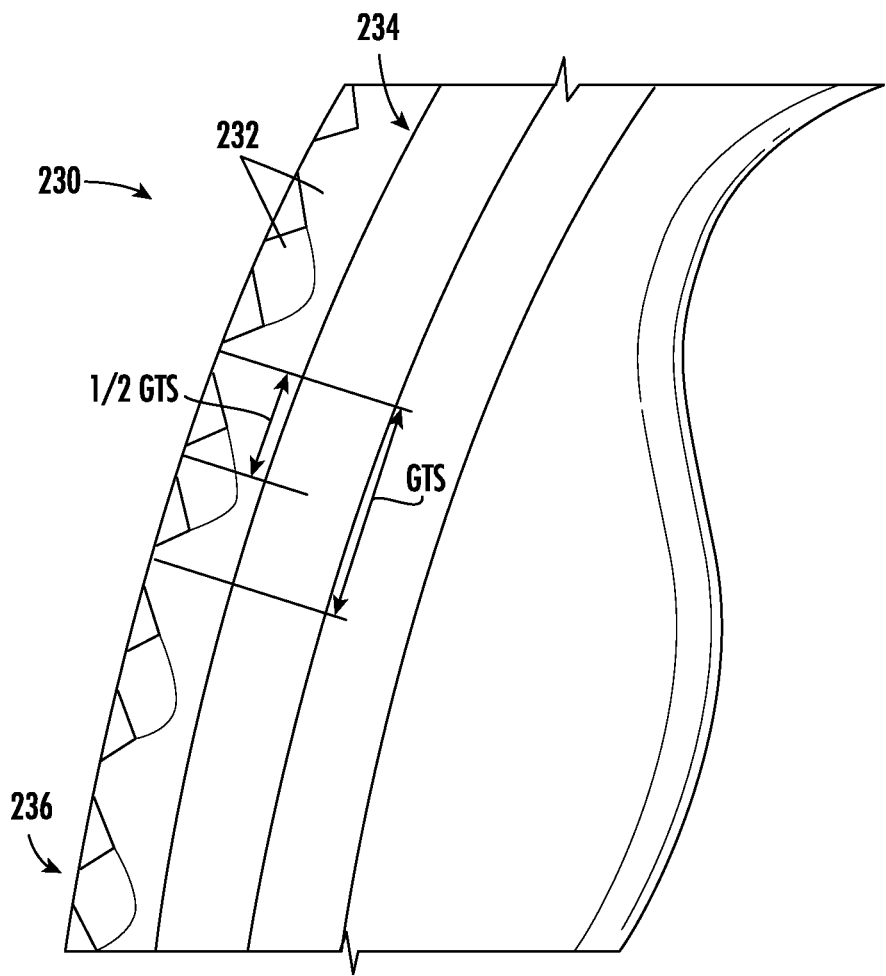
FIG. 17 is a plan view of the gear of the ratcheting mechanism of FIG. 6, according to an exemplary embodiment.
Figure 18:
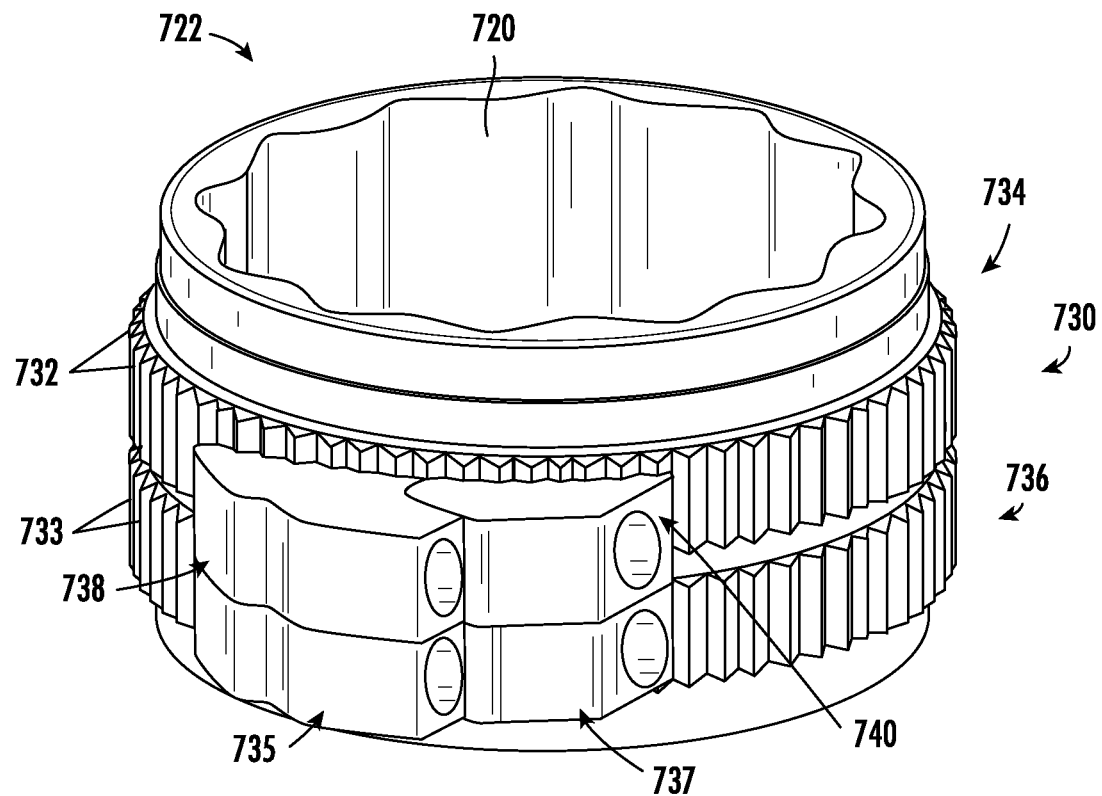
FIG. 18 is a perspective view of a ratcheting mechanism, according to another exemplary embodiment.
Figure 19:
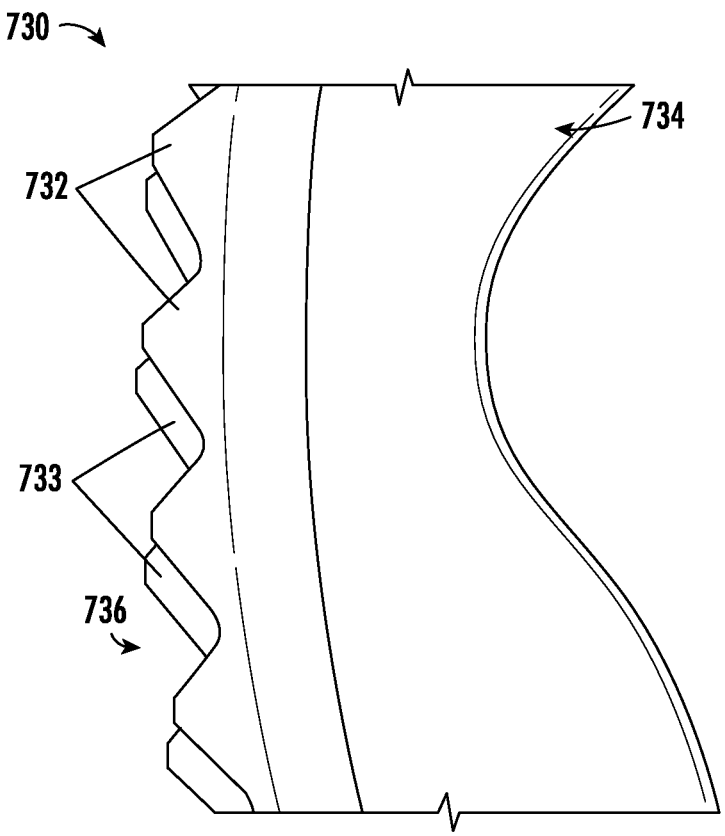
FIG. 19 is a plan view of the gear of the ratcheting mechanism of FIG. 18, according to an exemplary embodiment.
Figure 20:
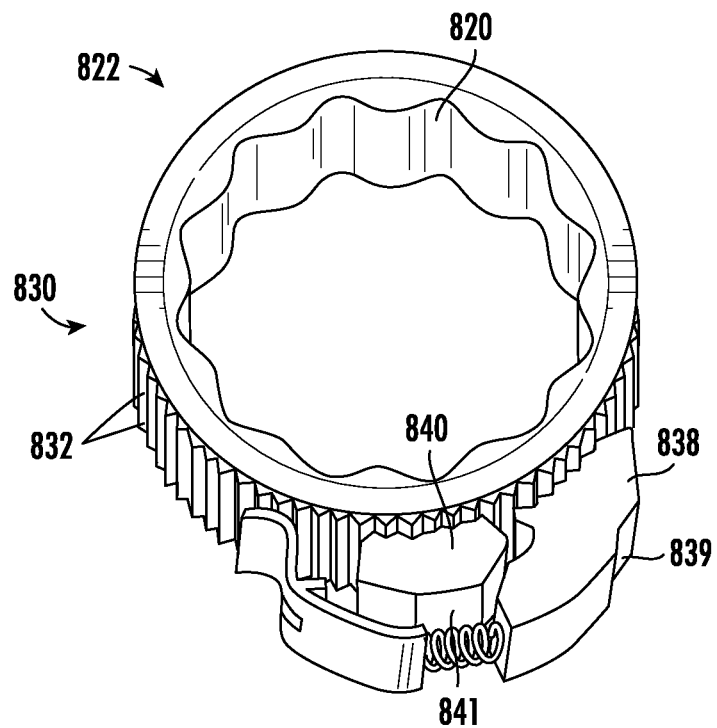
FIG. 20 is a perspective view of a ratcheting mechanism according to another exemplary embodiment.
Figure 21:
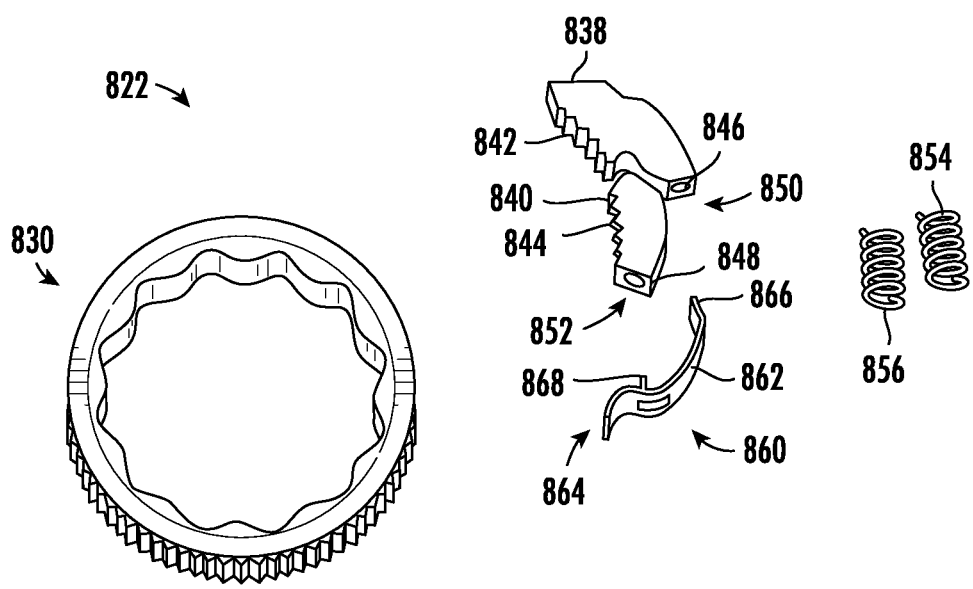
FIG. 21 is an exploded view of the ratchet mechanism of FIG. 20, according to an exemplary embodiment.

Referring to FIGS. 17-19, detailed views of the gear tooth spacing, or GTS are shown according to exemplary embodiments. As used herein, GTS is the circumferential distance or angular distance between adjacent gear teeth, as shown, for example, in FIGS. 17 and 19. The ratchet mechanisms discussed herein including spacing designed to decrease the distance that must be traveled for the pawl teeth to engage the gear teeth upon rotation of the tool body in the driving direction and therefore reduce the backlash. Further, Applicant has achieved four different tooth spacings using only three uniquely shaped components in contrast to many ratchet mechanisms where four pawls are offset ¼ from each other combined with a standard one row ratchet which has five uniquely shaped components. This design with a reduced number of unique components may reduce manufacturing costs and may allow for more efficient production compared to conventional ratchet mechanisms with more uniquely shaped components.

Referring to FIG. 17, a detailed plan view of a portion of ratcheting mechanism 222 is shown, according to an exemplary embodiment. As discussed above, gear 230 includes upper portion 234 and lower portion 236 with the plurality of teeth 232 of upper portion 234 offset from the plurality of teeth 232 of lower portion 236. In a specific embodiment, the offset spacing or circumferential distance between the teeth 232 of upper portion 234 and the teeth 232 of lower portion 236 is between ⅖ GTS and ⅗ GTS and more specifically about ½ GTS.

Figure 7:
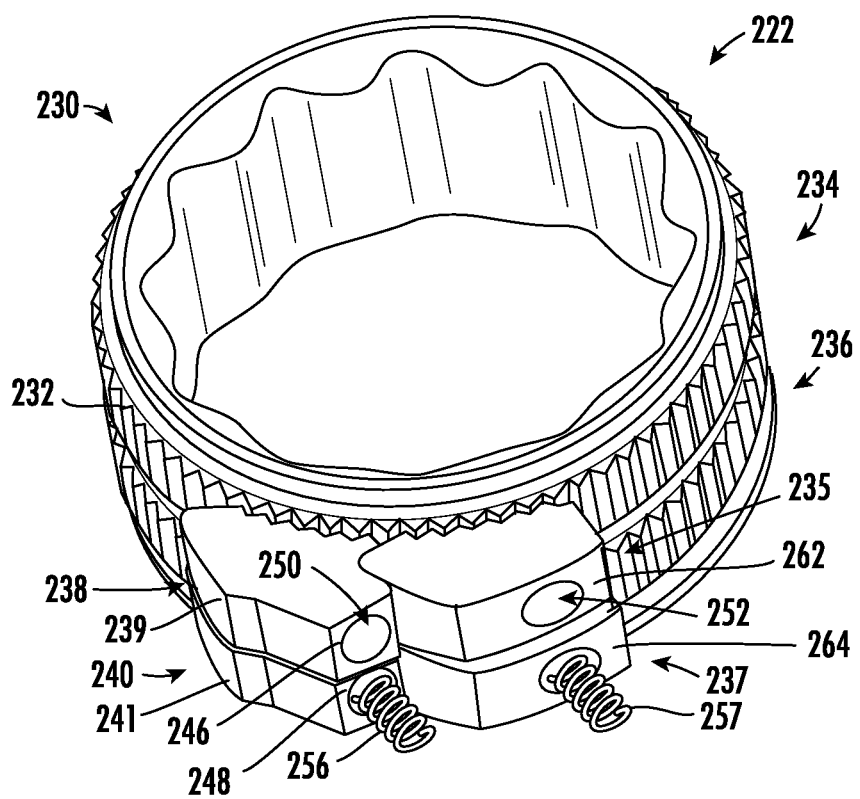
FIG. 7 is a perspective view of the ratchet mechanism of FIG. 6, according to an exemplary embodiment.

In Table 1 below, a specific embodiment of gear tooth spacing and pawl tooth spacing for a ratcheting mechanism with a gear including an upper and lower portion stacked together and four pawls stacked and in series (e.g., ratcheting mechanism 222) is described. In order to further reduce the backlash, the pawl tooth spacing or the circumferential distance or angular distance between adjacent pawl teeth is also chosen. As shown in FIG. 7, first pawl 238 is positioned in series with third pawl 235. Similarly, second pawl 240 is positioned in series with fourth pawl 237.

In such an embodiment, the pawl tooth spacing between first pawl 238 and third pawl 235 is between ⅛ and ⅜ and more specifically about ¼. Similarly, the pawl tooth spacing between second pawl 240 and fourth pawl 237 is between ⅛ and ⅜ and more specifically about ¼. A distance from a leading surface of one of the pawl teeth to the closest adjacent engagement surface of one of the gear teeth is about ¼. As can be seen from Table 1, the combination of GTS and pawl tooth spacing results in a ratchet mechanism with an effective tooth spacing that Applicant believes reduces backlash.

TABLE 1

| | Pawl Tooth Spacing | Related Gear Row Tooth Spacing | Effective Tooth Spacing |
|---|---|---|---|
| Pawl # 238 | 0 | 0 (upper portion 234) | 0 |
| Pawl # 235 | 1/4 | 0 (upper portion 234) | 1/4 |
| Pawl # 240 | 0 | ½ (lower portion 236) | 1/2 |
| Pawl # 237 | 1/4 | ½ (lower portion 236) | 3/4 |

Referring to FIGS. 18-19, another embodiment including a ratchet mechanism 722, that can be utilized with wrench 10 is shown. Ratchet mechanism 722 includes a sprocket or gear 730. Gear 730 is a generally ring or annularly shaped structure that includes an inner surface that defines an opening in which engagement surfaces 720 are located. The outer surface of gear 730 includes an upper or first portion 734 stacked on a lower or second portion 736. The teeth 732 of upper portion 734 are offset from the teeth 233 of lower portion 736. In a specific embodiment, the offset spacing or circumferential distance between the teeth 732 of upper portion 734 and the teeth 233 of lower portion 736 is between ⅕ GTS and ⅖ GTS and more specifically about ¼ GTS.

Ratchet mechanism 722 includes a first pawl 738 and a second pawl 740 are positioned in series (i.e., spaced circumferentially around gear 730 rather than stacked) and engage with upper portion 734 of gear 730. A third pawl 735 is stacked below first pawl 738 and engages with lower portion 736 of gear 730. A fourth pawl 737 is stacked below second pawl 740 and also engages with lower portion 736 of gear 730.

In Table 2 below, a specific embodiment of gear tooth spacing and pawl tooth spacing for a ratcheting mechanism with a gear including an upper and lower portion stacked together and four pawls stacked and in series (e.g., ratcheting mechanism 722) is described. In order to further reduce the backlash, the pawl tooth spacing or the circumferential distance or angular distance between adjacent pawl teeth is also chosen. As shown in FIG. 18, first pawl 738 is positioned in series with second pawl 740. Similarly, third pawl 735 is positioned in series with fourth pawl 737.

In such an embodiment, the pawl tooth spacing between first pawl 738 and second pawl 740 is between ⅖ and ⅗ and more specifically about ½. Similarly, the pawl tooth spacing between third pawl 735 and fourth pawl 737 is between ⅖ and ⅗ and more specifically about ½. As can be seen from Table 2, the combination of GTS and pawl tooth spacing of ratcheting mechanism 722 results in a ratchet mechanism with an effective tooth spacing that Applicant believes reduces backlash.

TABLE 2

| | Pawl Tooth Spacing | Related Gear Row Tooth Spacing | Effective Tooth Spacing |
|---|---|---|---|
| Pawl # 738 | 0 | 0 (upper portion 734) | 0 |
| Pawl # 740 | 1/2 | 0 (upper portion 734) | 1/2 |
| Pawl # 735 | 0 | 1/4 (lower portion 736) | 1/4 |
| Pawl # 737 | 1/2 | 1/4 (lower portion 736) | 3/4 |

Referring to FIGS. 20-23, additional embodiments of a ratchet mechanism, shown as a ratchet mechanism 822, that can be utilized with a tool, such as wrench 10 is shown. Applicant believes the pawl arrangements discussed herein, having limited engagement (i.e., engagement at a specific point and/or a fulcrum) between the pawls in series provides for improved performance of the ratchet mechanism compared to relative to conventional ratchet mechanisms with entire engagement (see e.g., FIGS. 8-9 where medial engagement surface has corresponding shape to engagement surface of the pawl in series). Specifically, Applicant believes the limited engagement and positioning of the medial and lateral fulcrums on the pawl allows for evenly distributed loads across the pawl teeth. Applicant believes the even load distribution allows for reduced wear and/or damage on the pawl teeth while also increasing the peak load capacity of the pawl (i.e., pawl can withstand greater loads). In another specific embodiment, Applicant believes using a steeper pawl tooth angle (i.e., reduction of angle) allows for increased load capacity of the pawl.

Ratchet mechanism 822 includes a sprocket or gear 830. Gear 830 is a generally ring or annularly shaped structure that includes an inner surface that defines an opening in which engagement surfaces 820 are located. In a specific embodiment, gear 830 includes a single layer (i.e., not stacked) including a plurality of teeth 832 which face radially outward from gear 830. Ratchet mechanism 822 includes an engagement structure shown as first pawl or front pawl 838 and second or center pawl 840 positioned in series (i.e., spaced circumferentially around gear 830 rather than stacked) with first pawl 838 and relatively centrally to first pawl 838.

First pawl 838 includes a first radially outward facing surface 839. Second pawl 840 includes a second radially outward facing surface 841. First and second radially outward facing surfaces 839, 841 extend in a generally circumferential direction. First pawl 838 and second pawl 840 each include a plurality of teeth 842 and 844 respectively, on a surface opposite of first radially outward facing surface 839 and second radially outward facing surface 841. In the orientation shown in FIGS. 21-23, each pawl 838, 840 further includes a counter-clockwise facing biasing surface 846 and 848 respectively that each define a bore 850, 852 to receive a biasing element, shown as springs 854 and 856.

The engagement structure of ratchet mechanism 822, further includes a biasing assembly 860. Biasing assembly 860 includes a body 862 with a curved end 864. An end of body 862 opposing the curved end 864 includes a first arm 866 extending away from body 862 in a generally radial direction toward first pawl 838. A second arm 868 extends inward from body 862 toward second pawl 840. Each spring 854, 856 includes a first end configured to couple and/or engage with bores 850 and 852 respectively and a second end configured to couple and/or engage with first arm 866 and second arm 868 of biasing assembly 860.

Applicant believes use of the biasing assembly 860 provides a reduction of reverse ratcheting torque. The use of an integral body 862 in combination with springs 854, 856 provides improved performance when compared to an integral single leaf spring biasing member that at smaller sizes may become stiff creating a large spring load that prevents a smooth acting ratcheting mechanism.

Figure 22:
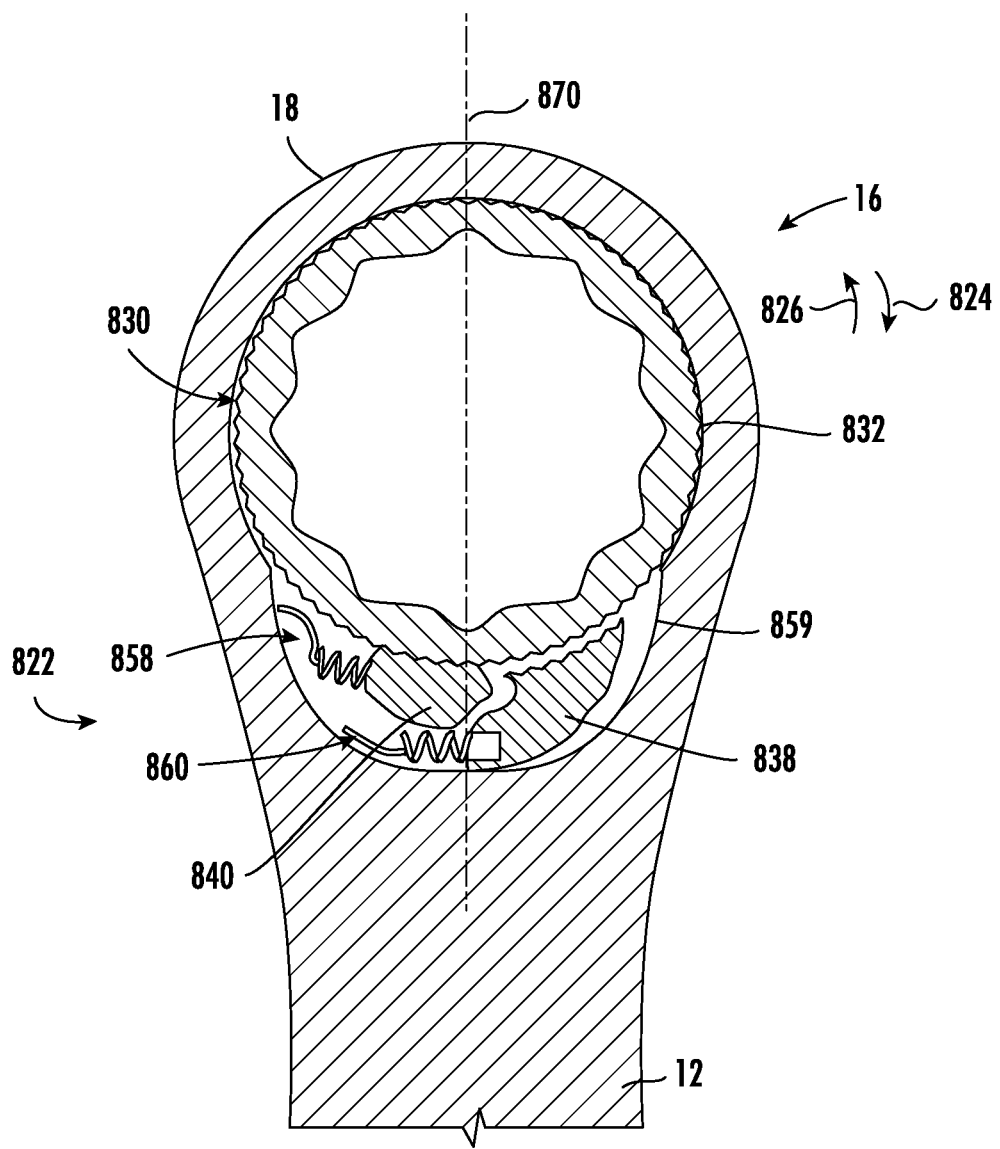
FIG. 22 is a cross-sectional view of a ratcheting tool, showing the ratcheting mechanism of FIG. 20 mounted within the tool body, according to an exemplary embodiment.

Referring to FIG. 22, details of the ratchet mechanism 822 relative to the tool body 12 are shown. Tool body 12 defines a lengthwise, central or medial axis 870 that extends lengthwise through the center of tool body 12 between opposing ends of the tool. In general, first pawl 838 is positioned on one side of the medial axis 870 while second pawl 840 extends across medial axis 870. Tool body 12 includes a recess or bore 858 shaped to receive first pawl 838 and second pawl 840. First radially outward facing surface 839 faces and engages with an inner surface 859 of bore 858. Curved end 864 of biasing assembly 860 extends from body 862 into a radially outward facing curve that engages inner surface 859 of bore 858.

In general, ratchet mechanism 822 is a mechanical structure that allows for free or unrestricted rotation of tool body 12 around engagement surfaces 820 in a clockwise direction, shown as arrow 824, and allows for restricted or driving rotation of tool body 12 around engagement surfaces 820 in a counter-clockwise direction 826. In general, during rotation in the unrestricted direction 824, ratchet mechanism 822 allows tool body 12 to rotate around engagement surfaces 820 (and around a fastening component located within engagement surfaces 820) without transferring torque to engagement surfaces 820, and during rotation in the restricted direction 826, ratchet mechanism 822 prevents tool body 12 from freely rotating around engagement surfaces 820 (and around a fastening component located within engagement surfaces 820) such that torque applied to tool body 12 is transferred to engagement surfaces 820 and to the fastening component located within engagement surfaces 820.

Figure 23:
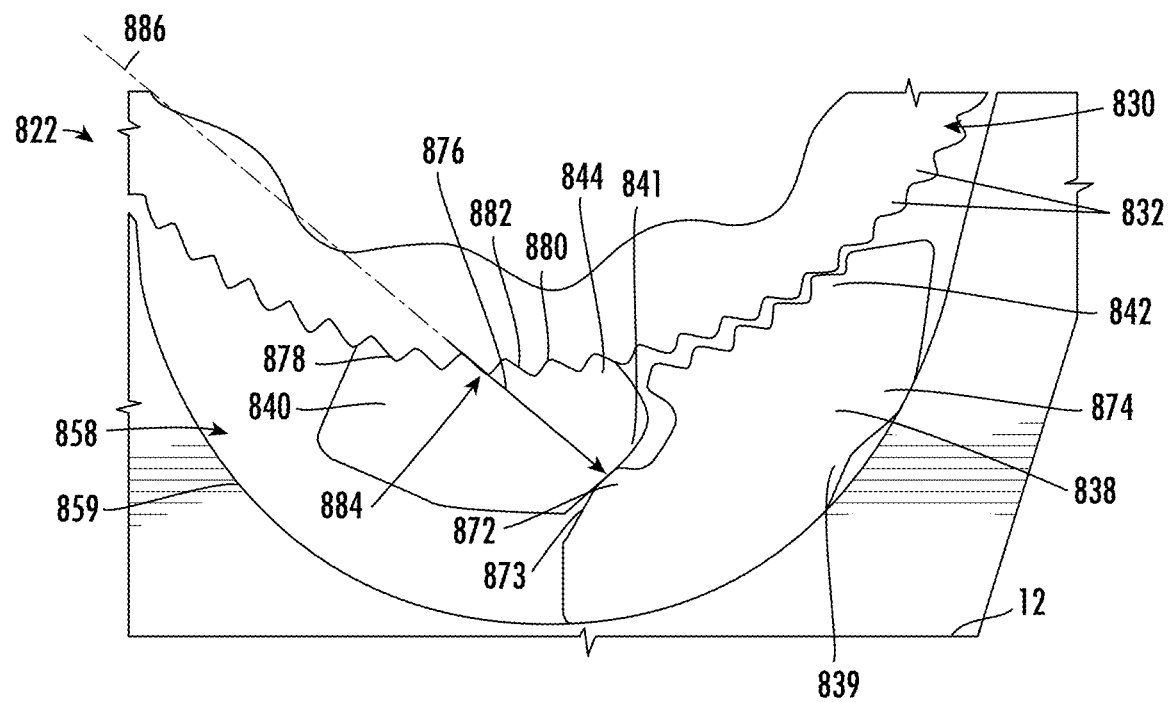
FIG. 23 is a detailed plan view showing the ratcheting mechanism ratcheting mechanism of FIG. 20 in a first loading state, according to an exemplary embodiment.

Referring to FIG. 23, ratchet mechanism 822 is shown in a first loading state. In the first loading state (central loading state), second pawl 840 is engaged (i.e., interacts and/or interface against) with first pawl 838 as pawl teeth 844 of second pawl 840 engage with gear teeth 832. When in the first loading state, only second pawl 840 is fully engaged with gear teeth 832 and second pawl 840 loads up against first pawl 838. While in the first loading state, a load is directed and/or applied by second radially outward facing surface 841 of second pawl 840 to a medial or inner projection 872 that acts as a fulcrum. Medial projection 872 is positioned on an inward facing surface 873 (i.e., facing toward second pawl 840 and/or gear 830) of first pawl 838 and extends toward the second pawl 840. In a specific embodiment, medial projection 872 has a concave shaped engagement surface such that the engagement between the first pawl 838 and second pawl 840 is located at the concave shaped engagement surface of the medial projection 872 (i.e., limited engagement compared to conventional pawls with full surface engagement). Medial projection 872 is an integral projection that defines the contact location between first pawl 838 and second pawl 840 and defines a contact area. Compared to previously described ratchet mechanisms (see e.g., FIGS. 6-11), the contact area between the first pawl 838 and second pawl 840 is reduced due to the limited engagement.

Inward facing surface 873 includes a scooped indent section or recessed section (i.e., recessed relative to remaining portions of inward facing surface 873) with medial projection 872 and the engagement surface extending away from the scooped indent section. Inward facing surface 873 further includes a substantially horizontal section (i.e., 180 degrees plus or minus 10 degrees) below medial projection 872 before transitioning to an end section. The end section of inward facing surface 873 joins to the first radially outward facing surface 839. The substantially horizontal section is positioned between the medial projection 872 and the end section.

The concave shaped engagement surface of medial projection 872 provides for limited engagement or contact between medial projection 872 and first pawl 838. As previously discussed, Applicant believes the limited engagement and locations of the medial and lateral projections on the pawl allows for evenly distributed loads across the pawl teeth reducing wear and/or damage on the pawl teeth while also increasing the peak load capacity of the pawl (i.e., pawl can withstand greater loads).

Figure 24:
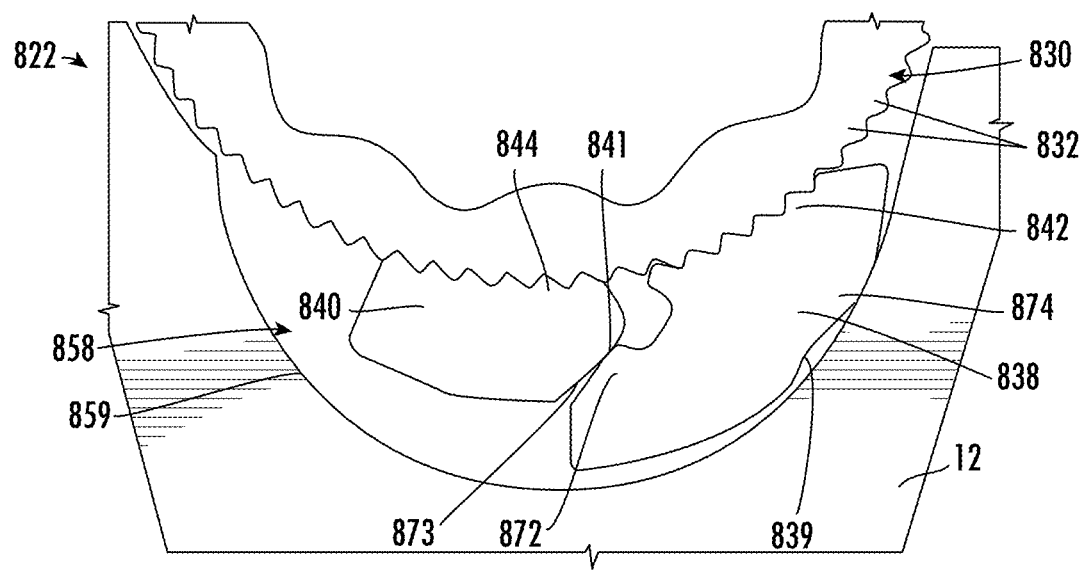
FIG. 24 is a detailed plan view showing the ratcheting mechanism ratcheting mechanism of FIG. 20 in a second loading state, according to an exemplary embodiment.

Referring to FIG. 24, ratchet mechanism 822 is shown in a second loading state. In the second loading state, front pawl 838 is engaged (i.e., pawl teeth 842 interact and/or interface with gear teeth 832) with gear 830. During the second loading state, first pawl 838 carries and/or receives a larger portion and/or all of the load driven by gear 830 while second pawl 840 is in clearance (see e.g., second pawl 840 in FIG. 22). As the peak load increases on the ratchet, the gap and/or space between second pawl 840 and first pawl 838 is reduced and eventually eliminated such that second pawl 840 will also carry and or receive a portion of the load. While in the second loading state, a load is directed and/or applied to a lateral or outer projection 874 of first pawl 838 positioned on first radially outward facing surface 839 and extends toward the bore 858. Lateral projection 874 acts as a fulcrum (i.e., pivot point) between first pawl 838 and inner surface 859 of bore 858.

In a specific embodiment, lateral projection 874 has a lateral concave shaped engagement surface such that the engagement between the first pawl 838 and inner surface 859 of bore 858 is located at the lateral concave shaped engagement surface of the lateral projection 874 (i.e., limited engagement compared to conventional pawls with full surface engagement). Specifically, the first radially outward facing surface 839 does not have complete or full surface engagement with inner surface 859 of bore 858.

The lateral projection extends toward inner surface 859 of the bore 858 and acts as a lateral fulcrum such that when the first pawl 838 engages the inner surface 859 of bore 858 the engagement surface of the lateral projection 874 interfaces against the inner surface 859 of the bore 858. In various embodiments, medial projection 872 and lateral projection 874 each have a concave shape (i.e., extend outward) relative to the respective surfaces of first pawl 838.

Figure 8:
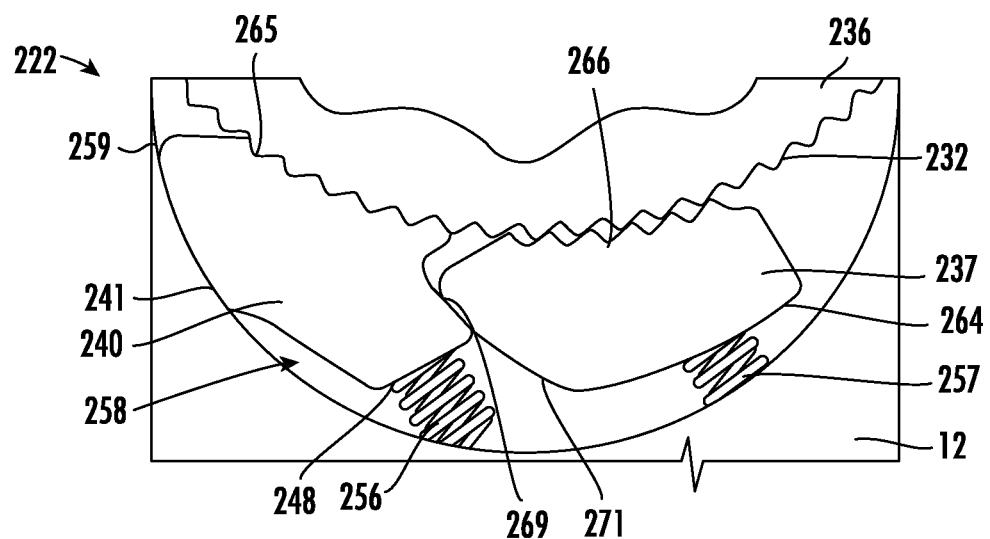
FIG. 8 is a detailed plan view showing a lower portion of the ratcheting mechanism ratcheting mechanism of FIG. 6, according to an exemplary embodiment.
Figure 9:
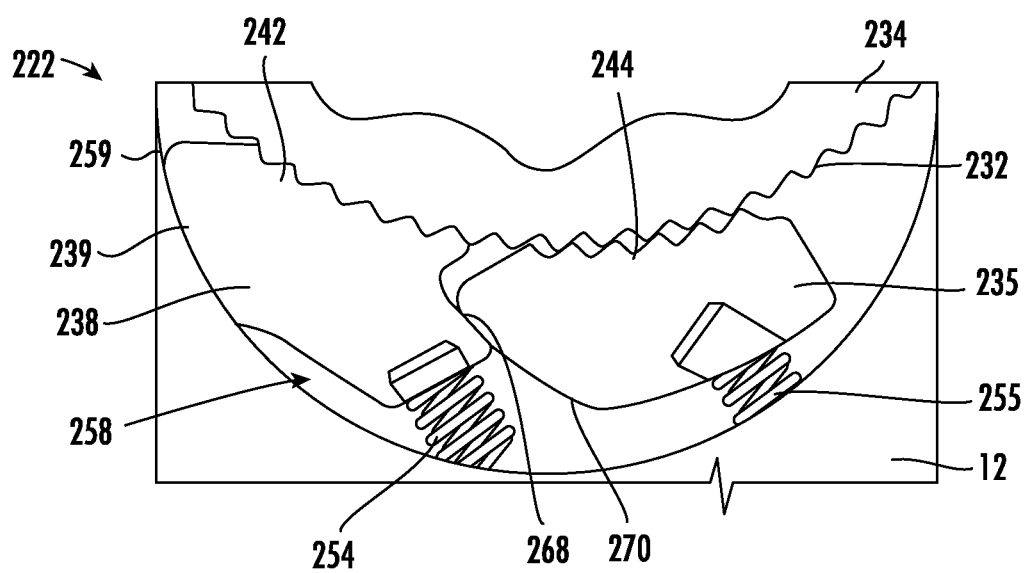
FIG. 9 is a detailed plan view showing an upper portion of the ratcheting mechanism of FIG. 6, according to an exemplary embodiment.

Applicant believes the pawl arrangements shown in FIGS. 23-24, with limited engagement (i.e., engagement at a specific point and/or a fulcrum) between first pawl 838 and second pawl 840 provides for improved performance of ratchet mechanism 822 relative to conventional ratchet mechanisms with entire engagement (see e.g., FIGS. 8-9 where medial engagement surface has corresponding shape to engagement surface of the pawl in series). Specifically, Applicant believes the limited engagement and positioning of the medial and lateral projections 872, 874 on first pawl 838 that act as fulcrums allow for evenly distributed loads across the pawl teeth. Applicant believes the even load distribution allows for reduced wear and/or damage to the pawl teeth, increased ability of pawls to withstand greater loads (i.e., peak load capacity or maximum torque), and reduced potential for the ratcheting mechanism to jam and/or slip.

A plurality of root surfaces 878 are positioned between the plurality of pawl teeth 844 of second pawl 840. The root surfaces 878 are the lower and/or innermost surface of the trough located between adjacent pawl teeth. Each root surface 878 is positioned between a counter-clockwise facing surface 880 of a pawl tooth 844 and a leading surface 882 of a trailing, adjacent pawl tooth 844. When there are an even number of pawl teeth 844, there is an odd number of root surfaces 878 (i.e., when 6 pawl teeth 844 are 5 root surfaces 878). A middle or center root surface 884 is defined as having an equal number of root surfaces 878 on each side of center root surface 884. In a specific embodiment, there are 6 pawl teeth and 5 root surfaces. In other embodiments, there may be a different number of pawl teeth and root surfaces (i.e., 8 pawl teeth, 7 root surfaces, etc.).

Referring to FIG. 23, a resultant load shown by arrow 876 is applied to medial projection 872 of front pawl 838 when second radially outward facing surface 841 of second pawl 840 engages with inward facing surface 873 of first pawl 838. Second radially outward facing surface 841 of second pawl 940 has full surface to surface contact with inward facing surface 873 of first pawl 838 such that the load is distributed across the entire projection 872. Applicant believes the position of medial projection 872 provides even load distribution across pawl teeth 844, when directed load 876 is positioned as shown in FIG. 23. Load 876 is positioned along a plane 886 extending along the leading surface 882 of the pawl tooth 844 trailing center root surface 884. Plane 886 intersects with medial projection 872 of first pawl 838. In a specific embodiment, plane 886 and the leading surface 882 of the pawl tooth 844 trailing center root surface 884 is positioned at an angle.

Figures 25, 26:
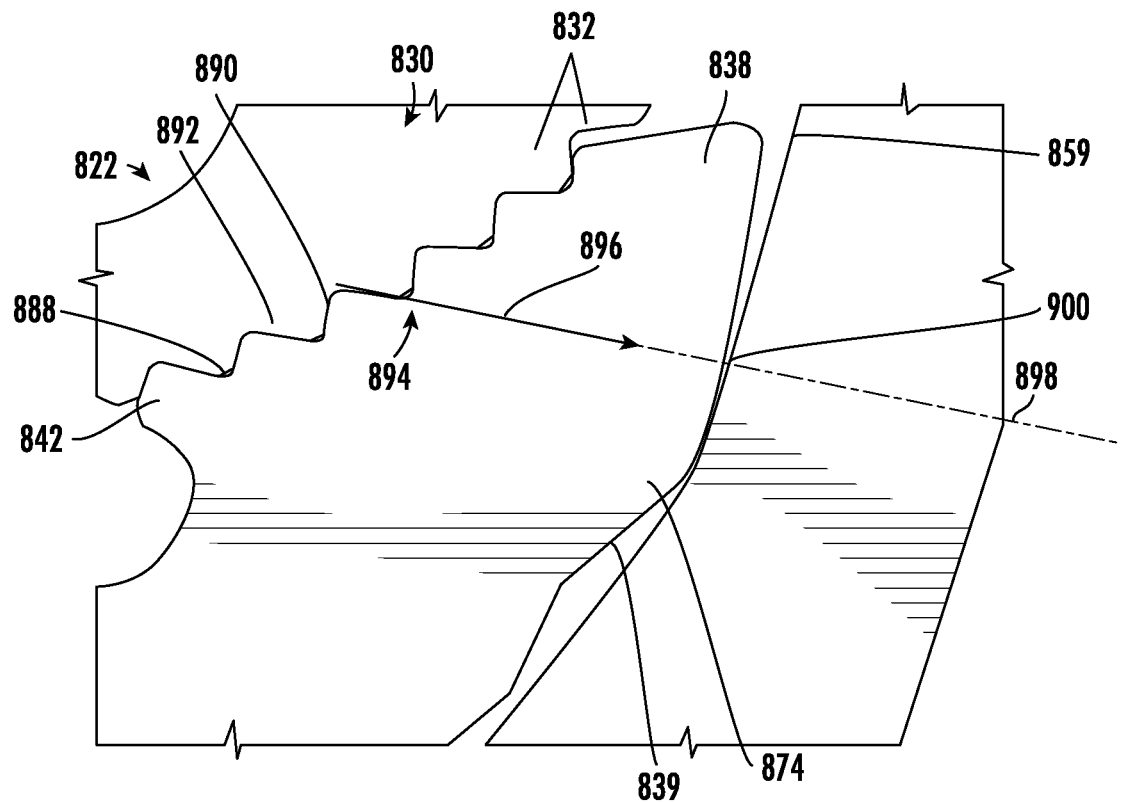
FIG. 25 is a detailed plan view showing the first pawl with a lateral fulcrum location according to an exemplary embodiment.
FIG. 26 is a detailed plan view showing the first pawl with the lateral fulcrum location according to another exemplary embodiment.

Referring to FIGS. 25-26, details of the location and/or position of lateral projection 874 of first pawl 838 are shown according to exemplary embodiments. A plurality of root surfaces 888 are positioned between the plurality of pawl teeth 842 of first pawl 838. Each root surface 888 is positioned between a counter-clockwise facing surface 890 of a pawl tooth 842 and a leading surface 892 of a trailing, adjacent pawl tooth 842. When there are an even number of pawl teeth 842, there is an odd number of root surfaces 888 (i.e., when 6 pawl teeth 842 are 5 root surfaces 888). A middle or center root surface 894 is defined as having an equal number of root surfaces 888 on each side of center root surface 894. In a specific embodiment, there are 6 pawl teeth and 5 root surfaces. In other embodiments, there may be a different number of pawl teeth and root surfaces (i.e., 8 pawl teeth, 7 root surfaces, etc.).

Referring to FIG. 25, a resultant load shown by arrow 896 occurs along leading surface 892 of pawl tooth 842 trailing center root surface 894 when first radially outward facing surface 839 of front pawl 838 engages with inner surface 859 of bore 858. The surface area of engagement during loading is limited to the lateral projection 874. Applicant believes the position of lateral projection 874 provides improved performance in terms of even load distribution across pawl teeth 842, when the load 896 is positioned as shown in FIG. 25.

Resultant load 896 is positioned along a plane 898 extending along the leading surface 892 of the pawl tooth 842 trailing center root surface 894. Plane 898 intersects with inner surface 859 of bore 858 at an intersection point 900. In a specific embodiment, lateral projection 874 is positioned between 12 and 18 degrees below, and more specifically between 13 and 17 degrees below plane 898 and/or intersection point 900. In such an embodiment, lateral projection 874 is positioned about 15 degrees (i.e., 15 degrees plus or minus 3 degrees) below plane 898 and resultant load 896.

Referring to FIG. 26, in another embodiment, a resultant load shown by arrow 906 occurs along leading surface 892 of pawl tooth 842 trailing center root surface 894 when first radially outward facing surface 839 of front pawl 838 engages with inner surface 859 of bore 858. Applicant believes the position of lateral projection 874 provides improved performance in terms of even load distribution across pawl teeth 842, when the resultant load 906 is positioned as shown in FIG. 26. As previously discussed, Applicant believes even load distribution allows for reduced wear and/or damage to the pawl teeth, increased peak load capacity, and reduced potential for the ratcheting mechanism to jam and/or slip.

Resultant load 906 is positioned along a plane 908 extending along the leading surface 892 of the pawl tooth 842 trailing center root surface 894. Plane 908 intersects with inner surface 859 of bore 858 at a point 910. In a specific embodiment, lateral projection 874 is positioned between 4 and 10 degrees below, and more specifically between 5 and 9 degrees below plane 908 and/or intersection point 910. In such an embodiment, lateral projection 874 is positioned about 7 degrees (i.e., 7 degrees plus or minus 3 degrees) below plane 908 and resultant load 906.

Figure 27:
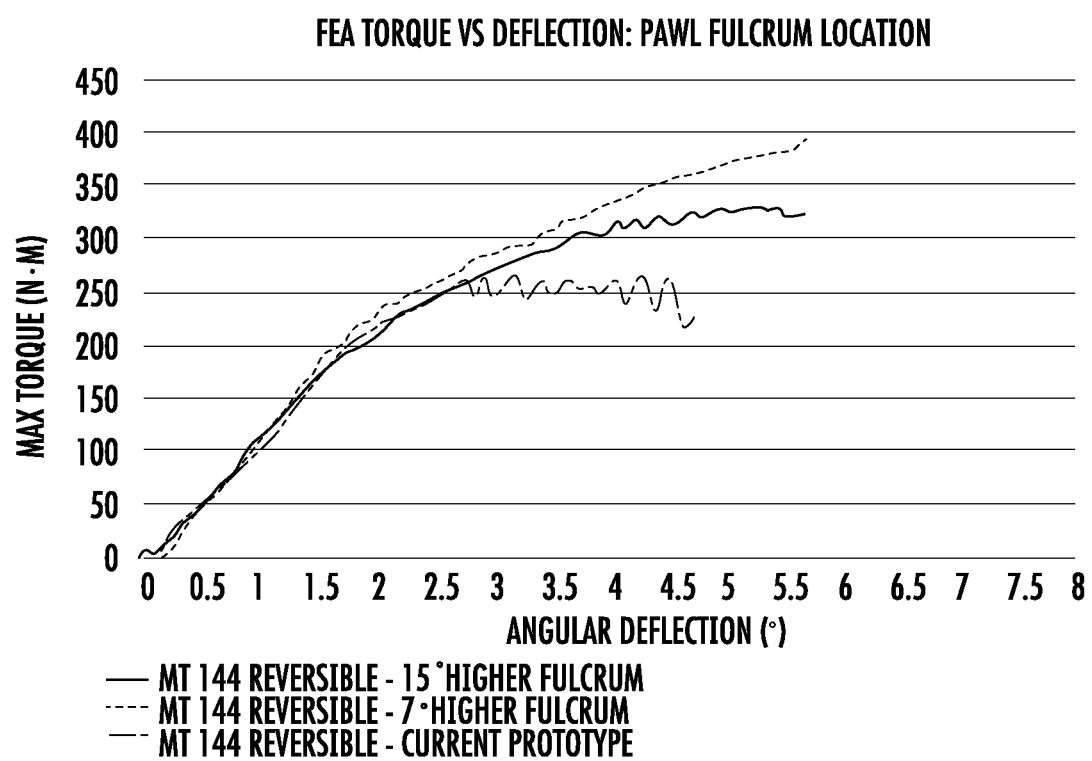
FIG. 27 is a plot of the maximum torque of the first pawl for various lateral fulcrum positions of the present disclosure plotted relative to the angular deflection of the first pawl, according to exemplary embodiments.

Referring to FIG. 27, a plot of test data showing the maximum torque of the first pawl for various lateral fulcrum positions of the present disclosure plotted relative to the angular deflection of the first pawl according to the exemplary embodiments shown in FIGS. 25-26. Additionally, the maximum torque relative to the angular deflection of an alternative exemplary embodiment is shown. The alternative exemplary embodiment, has a lateral pawl location of 15 degrees below.

In a specific embodiment, when the lateral projection 874 is positioned about 7 degrees (i.e., 7 degrees plus or minus 3 degrees) below plane 908 and resultant load 906, the maximum toque is increased. Specifically, the peak load capacity is increased about 2-3% (i.e., 2% plus or minus 1%). In a specific embodiment, when lateral projection 874 is positioned about 15 degrees (i.e., 15 degrees plus or minus 3 degrees) below plane 898 and resultant load 896, the maximum toque is increased.

Figure 28:
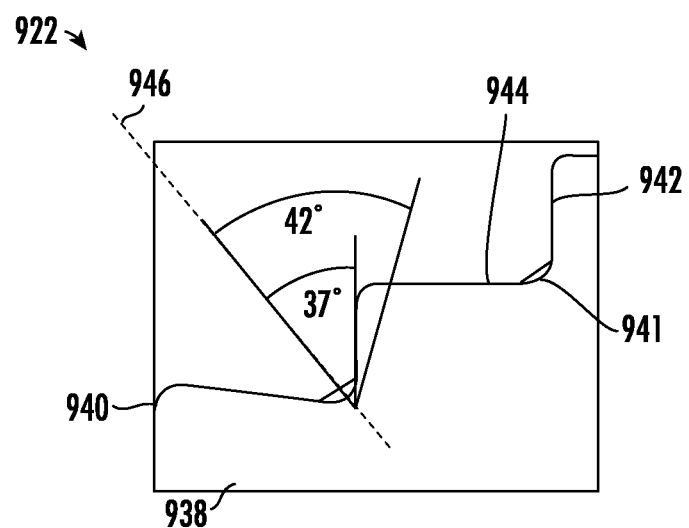
FIG. 28 is a detailed plan view showing the tooth angle of a pawl, according to an exemplary embodiment.

Referring to FIG. 28, a detailed plan view of the tooth angle of a pawl is shown according to an exemplary embodiment. As will be discussed in greater detail below, Applicant believes a steeper pawl tooth angle allows for increased load capacity or maximum torque of the pawl.

A portion of a ratchet mechanism 922 is shown according to an exemplary embodiment. A pawl 938 of ratchet mechanism 922 includes a plurality of pawl teeth 940. A plurality of root surfaces 941 are positioned between the plurality of pawl teeth 940 of pawl 938. Each root surface 941 is positioned between a counter-clockwise facing surface 942 of a pawl tooth 940 and a leading surface 944 of a trailing, adjacent pawl tooth 940. A tooth angle is defined between a plane 946 that bisects a root surface 941 and the counter-clockwise facing surface 942 of the pawl tooth 940 adjacent to the root surface 941.

In a specific embodiment, the tooth angle is between 32 degrees and 42 degrees. In a specific embodiment, the tooth angle is about 42 degrees (i.e., 42 degrees plus or minus 2 degrees). In another specific embodiment, the tooth angle is about 32 degrees (i.e., 32 degrees plus or minus 2 degrees). In another specific embodiment, the tooth angle is about 37 degrees (i.e., 37 degrees plus or minus 2 degrees).

Figure 29:
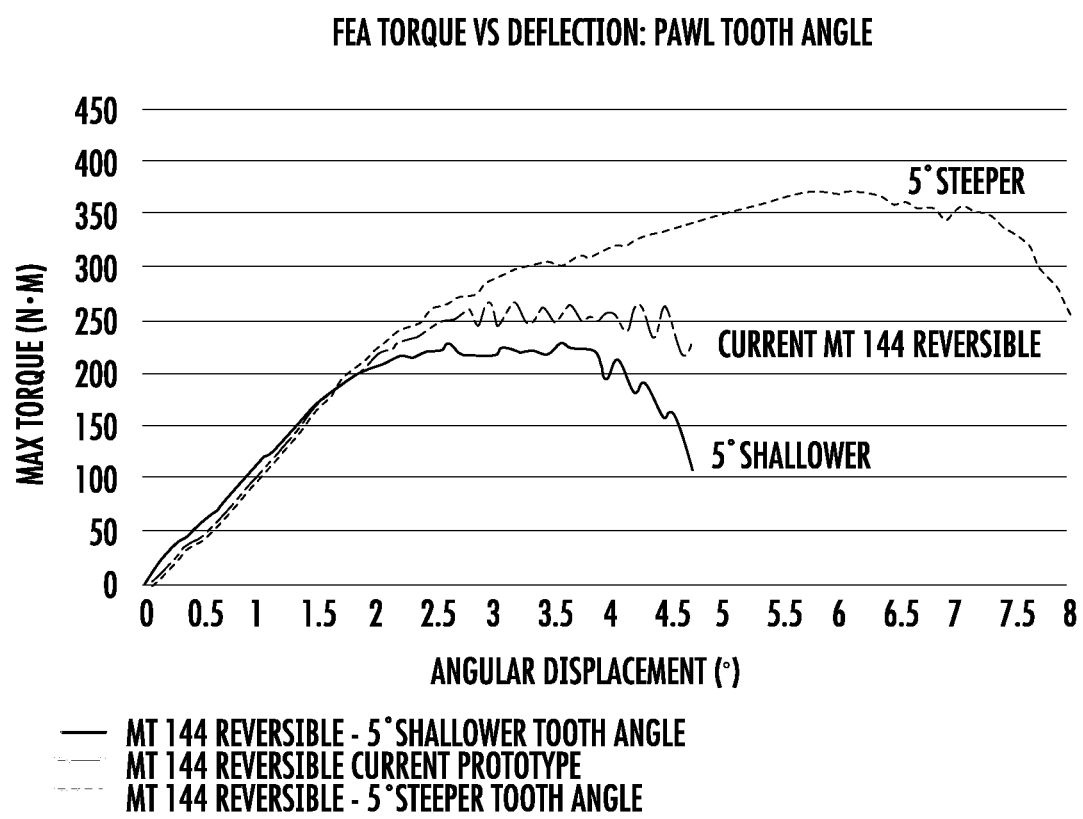
FIG. 29 is a plot of the maximum torque of the pawl for various tooth angle embodiments of the present disclosure plotted relative to the angular deflection of the pawl, according to exemplary embodiments.

Referring to FIG. 29, a plot of test data showing the maximum torque of the pawl for various tooth angles of the present disclosure is plotted relative to the angular deflection of the pawl according to exemplary embodiments shown in FIG. 28. Additionally, the maximum torque relative to the angular deflection of an alternative exemplary embodiment with a shallow tooth angle relative the tooth angles previously described is shown.

Applicant believes a shallower tooth angle provides an improved arc swing (reduces arc swing) allowing for use in more confined work environments.

Figure 30:
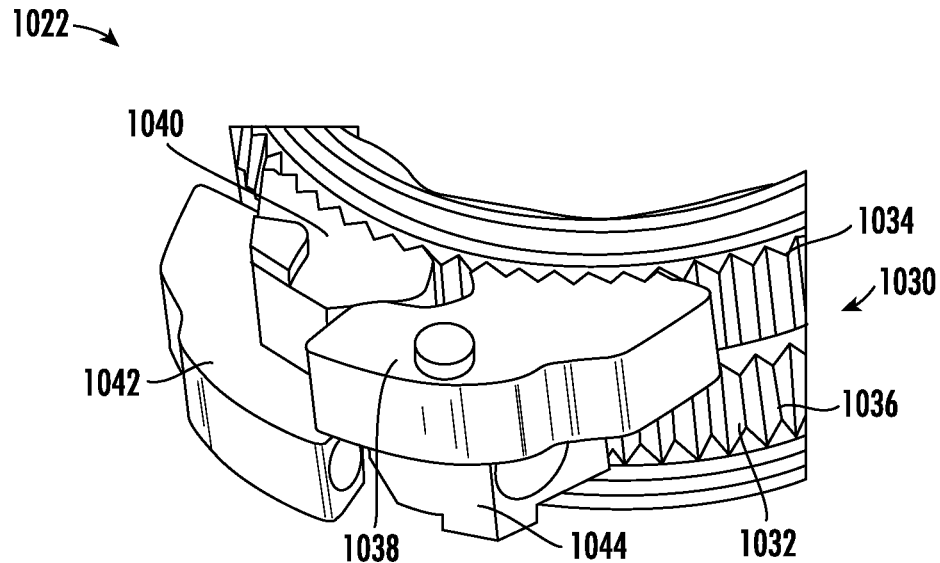
FIG. 30 is a perspective view of a reversible ratcheting mechanism, according to another exemplary embodiment.

Referring to FIGS. 30-33, another embodiment including a ratchet mechanism 1022, that can be utilized with wrench 10 is shown. In general, ratchet mechanism 1022 is substantially the same as the previous ratchet mechanisms except for the differences discussed herein. FIG. 30 shows a gear 1030 with stacked layers including an upper or first portion 1034 stacked on a lower or second portion 1036. Upper portion 1034 and lower portion 1036 of gear 1030 each include a plurality of teeth 1032 which face radially outward from gear 1030. The teeth 1032 of upper portion 1034 are offset from the teeth 1032 of lower portion 1036.

Figure 32:
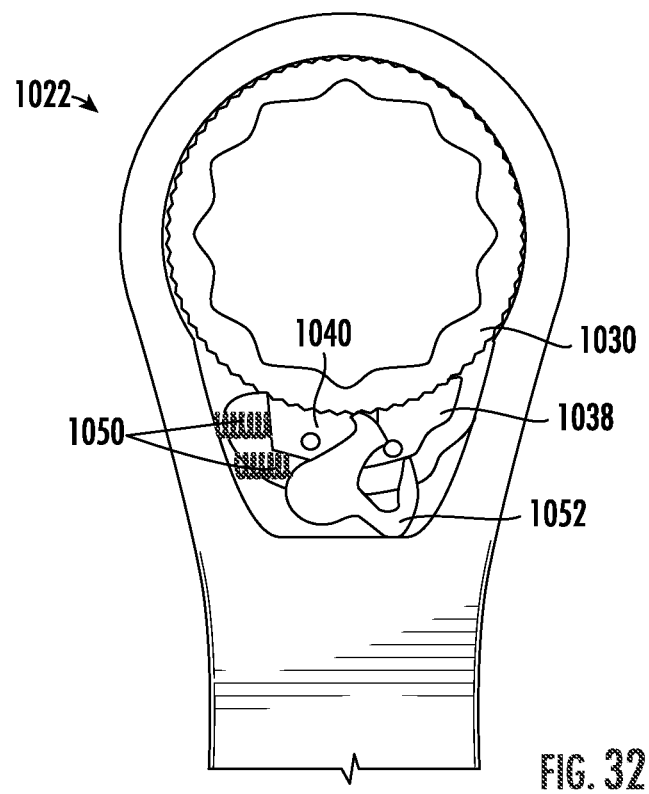
FIG. 32 is a detailed perspective view showing an upper portion of the reversible ratcheting mechanism of FIG. 30 in an engaged position, according to an exemplary embodiment.
Figure 33:
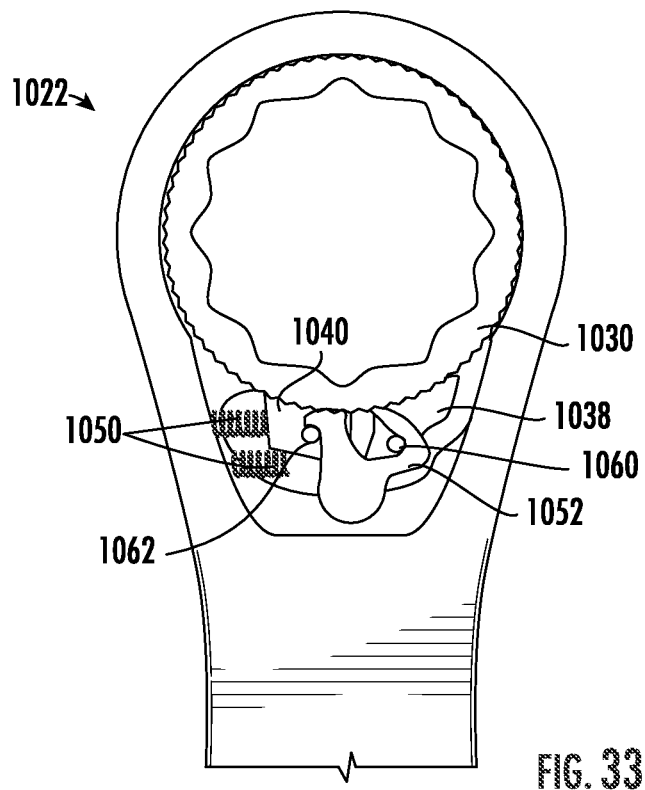
FIG. 33 is a detailed perspective view showing the upper portion of the reversible ratcheting mechanism of FIG. 30 in a disengaged position, according to an exemplary embodiment.

Ratchet mechanism 1022 includes an engagement structure shown as first pawl or front pawl 1038 and second or center pawl 1040 positioned in series (i.e., spaced circumferentially around gear 1030 rather than stacked) with first pawl 1038 and relatively centrally to first pawl 1038 (i.e., not positioned to engage with inner surface of the tool—See FIGS. 32-33). Ratchet mechanism 1022 further includes a third pawl 1042 and a fourth pawl 1044 substantially the same as first pawl 1038 and second pawl 1040 respectively except the orientation is reversed (i.e., third pawl engages with tool body). Third pawl 1042 and fourth pawl 1044 are stacked below first pawl 1038 and second pawl 1040 and configured to engage lower portion 1036 of gear 1030. The upper portion of ratchet mechanism 1022, specifically first and second pawls 1038, 1040 are configured to drive in a counterclockwise orientation. The lower portion of ratchet mechanism 1022, specifically third and fourth pawls 1042, 1044 are configured to drive in a clockwise direction.

Figure 31:
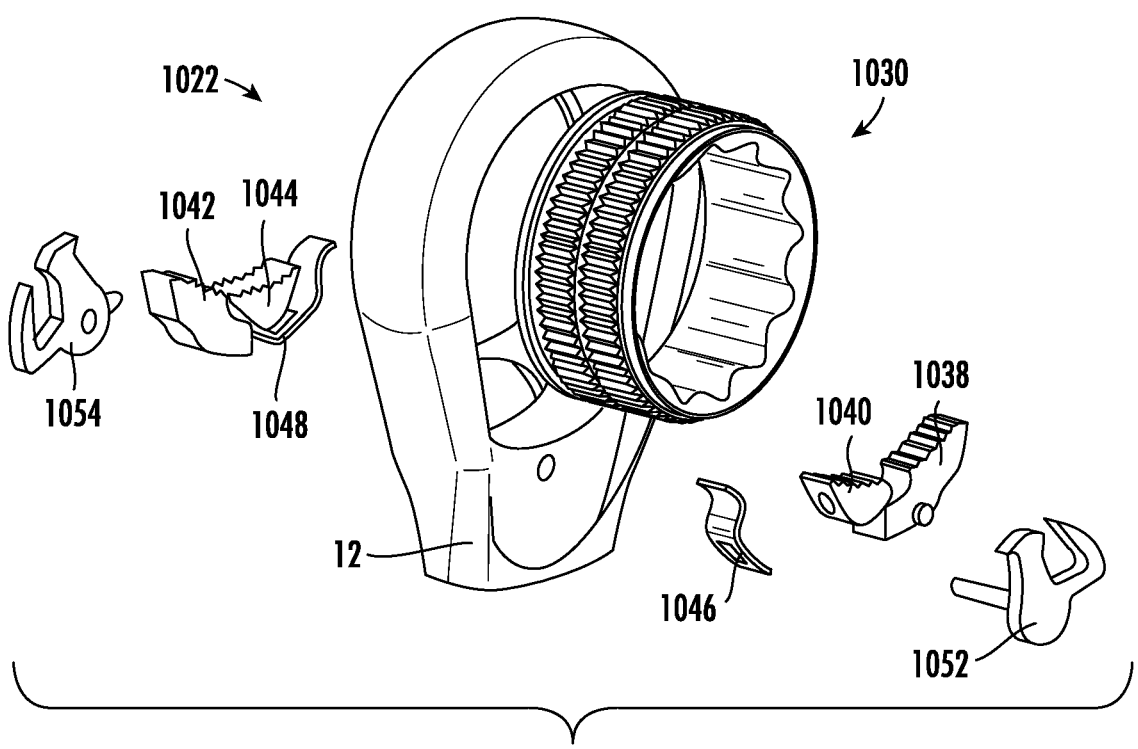
FIG. 31 is an exploded view of the ratcheting mechanism of FIG. 30, according to an exemplary embodiment.

Referring to FIG. 31, an exploded view of the ratcheting mechanism 1022 is shown according to an exemplary embodiment. The first and second pawls 1038, 1040 engage with a biasing assembly 1046 while third and fourth pawls 1042, 1044 similarly engage with a biasing assembly 1048. Biasing assemblies 1046 and 1048 are substantially the same as biasing assembly 860 and engage with biasing components, shown as springs 1050 (see e.g., FIG. 32). Ratcheting mechanism 1022 further includes a front switch 1052 configured to engage or disengage first and second pawls 1038, 1040 depending on the desired driving direction. Similarly, a rear switch 1054 is configured to engage or disengage third and fourth pawls 1042, 1044 depending on the desired driving direction.

Referring to FIGS. 32-33, detailed perspective views showing the upper portion of the ratchet mechanism 1022 in a first, engaged position and a second disengaged position are shown according to an exemplary embodiment. In FIG. 32, front switch 1052 is in a disengaged position meaning first and second pawls 1038, 1040 are engaged with gear 1030. In FIG. 33, front switch 1052 has been toggled or reversed. When front switch 1052 is reversed, front switch engages and/or interfaces with a first biasing surface 1060 on first pawl 1038 and a second biasing surface 1062 on second pawl 1040 to push and/or move first and second pawls 1038, 1040 out of contact with gear 1030 (i.e., pawls now spaced a distance from the gear).

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed:

1. A driving tool comprising:
a body including a bore;
a workpiece engagement surface coupled to the body;
a ratchet mechanism supported by the body within the bore and coupled to the workpiece engagement surface, the ratchet mechanism comprising:
a gear coupled to the workpiece engagement surface, the gear comprising gear teeth;
a pawl structure comprising:
a first pawl comprising first pawl teeth and a first radially outward facing surface;
a second pawl comprising second pawl teeth and a second radially outward facing surface, the second pawl placed in series with the first pawl such that the first pawl and the second pawl are spaced circumferentially around the gear and configured to engage the gear; and
a biasing assembly coupled to the first pawl and the second pawl, the biasing assembly comprising:
a biasing body comprising:
a first end;
a second end opposing the first end;
a first arm positioned at the first end and extending toward the first pawl; and
a second arm extending from the body toward the second pawl;
a first spring extending between and engaging the first pawl and the first arm; and
a second spring extending between and engaging the second pawl and the second arm;
wherein the first pawl includes a medial projection positioned on a surface facing the second pawl, the medial projection extending toward the second pawl and acting as a medial fulcrum and wherein the first pawl includes a lateral projection positioned on the first radially outward facing surface of the first pawl, the lateral projection extending toward an inner surface of the bore acting as a lateral fulcrum such that when a force is applied to the first pawl a load is evenly distributed across the first pawl teeth.

2. The driving tool of claim 1, wherein the biasing assembly is configured such that the first pawl and the second pawl move away from the gear teeth such that the first pawl teeth and second pawl teeth can rotate past the gear teeth in a first rotational direction and wherein the first pawl teeth and the second pawl teeth engage the gear teeth such that the first pawl teeth and second pawl teeth are rotationally fixed relative to the gear teeth in a second rotational direction.

3. The driving tool of claim 1, wherein the biasing body is formed from a single, integral piece of material.

4. The driving tool of claim 1, wherein the medial projection has a concave shaped engagement surface such that engagement between the second pawl and the first pawl is located at the concave shaped engagement surface of the medial projection.

5. The driving tool of claim 1, wherein the lateral projection has a lateral concave shaped engagement surface such that engagement between the first pawl and the inner surface of the bore is located at the lateral convex shaped engagement surface of the lateral projection.

6. The driving tool of claim 1, wherein, when the ratchet mechanism is in a first loading state, the second pawl teeth engage with the gear teeth and the second radially outward facing surface applies a load to the medial projection of the first pawl.

7. The driving tool of claim 1, wherein, when the ratchet mechanism is in a second loading state, the first pawl teeth engage with the gear teeth and the first radially outward facing surface of the first pawl interfaces against the inner surface of the bore such that a load is applied to the lateral projection of the first pawl.

8. A driving tool comprising:
a body including a bore;
a workpiece engagement surface coupled to the body; and a ratchet mechanism supported by the body within the bore and coupled to the workpiece engagement surface, the ratchet mechanism comprising:
  a gear structure coupled to the workpiece engagement surface, the gear structure comprising gear teeth;
  a pawl structure comprising:
    a first pawl comprising first pawl teeth and a first radially outward facing surface;
    a second pawl comprising second pawl teeth and a second radially outward facing surface, the second pawl placed in series with the first pawl such that the first pawl and the second pawl are spaced circumferentially around the gear structure and configured to engage the gear teeth; and
  a biasing assembly coupled to the first pawl and the second pawl, the biasing assembly comprising:
    a biasing body comprising:
      a first end;
      a second end opposing the first end;
      a first arm positioned at the first end and extending toward the first pawl; and
      a second arm extending from the body toward the second pawl;
    a first spring extending between and engaging the first pawl and the first arm; and
    a second spring extending between and engaging the second pawl and the second arm;
  wherein the first pawl includes a medial projection positioned on a surface facing the second pawl, the medial projection extending toward the second pawl and acting as a medial fulcrum and wherein the first pawl includes a lateral projection with an engagement surface positioned on the first radially outward facing surface of the first pawl, the lateral projection extending toward an inner surface of the bore and acting as a lateral fulcrum such that when the first pawl engages the inner surface of the bore the engagement surface of the lateral projection interfaces against the inner surface of the bore.

9. The driving tool of claim 8, further comprising a plurality of root surfaces positioned between the first pawl teeth, each root surface positioned between a counterclockwise facing surface of a first pawl tooth and a leading surface of an adjacent first pawl tooth.

10. The driving tool of claim 9, wherein first pawl includes an even number of first pawl teeth and wherein a center root surface includes an equal number of root surfaces on each side of the center root surface.

11. A driving tool comprising:
a body including a bore;
a workpiece engagement surface coupled to the body; and
a ratchet mechanism supported by the body within the bore and coupled to the workpiece engagement surface, the ratchet mechanism comprising:
  a gear structure coupled to the workpiece engagement surface, the gear structure comprising gear teeth;
  a pawl structure comprising:
    a first pawl comprising first pawl teeth and a first radially outward facing surface; and
    a second pawl comprising second pawl teeth and a second radially outward facing surface, the second pawl placed in series with the first pawl such that the first pawl and the second pawl are spaced circumferentially around the gear structure and configured to engage the gear teeth; and
  a biasing assembly coupled to the first pawl and the second pawl, the biasing assembly comprising:
    a biasing body comprising:
      a first end;
      a second end opposing the first end;
      a first arm positioned at the first end and extending toward the first pawl; and
      a second arm extending from the body toward the second pawl;
    a first spring extending between and engaging the first pawl and the first arm; and
    a second spring extending between and engaging the second pawl and the second arm;
  wherein the first pawl includes a lateral projection with an engagement surface positioned on the first radially outward facing surface of the first pawl, the lateral projection extending toward an inner surface of the bore and acting as a lateral fulcrum such that when the first pawl engages the inner surface of the bore the engagement surface of the lateral projection interfaces against the inner surface of the bore.

12. The driving tool of claim 11, further comprising a plurality of root surfaces positioned between the first pawl teeth, each root surface positioned between a counterclockwise facing surface of a first pawl tooth and a leading surface of an adjacent first pawl tooth.

13. The driving tool of claim 12, wherein first pawl includes an even number of first pawl teeth and wherein a center root surface includes an equal number of root surfaces on each side of the center root surface.

* * * * *